(12) United States Patent
Staton et al.

(10) Patent No.: US 11,392,818 B2
(45) Date of Patent: *Jul. 19, 2022

(54) GRAPHICALLY ENCODED ICONS HAVING INTRINSIC ATTRIBUTES EMBEDDED THEREIN AND SYSTEMS AND METHODS FOR USING SAME

(71) Applicant: Newtonoid Technologies, L.L.C., Liberty, MO (US)

(72) Inventors: Fielding B. Staton, Liberty, MO (US); David Strumpf, Columbia, MO (US)

(73) Assignee: Newtonoid Technologies, L.L.C., Liberty, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/216,096

(22) Filed: Mar. 29, 2021

(65) Prior Publication Data
US 2021/0216844 A1 Jul. 15, 2021

Related U.S. Application Data

(63) Continuation of application No. 16/667,552, filed on Oct. 29, 2019, now Pat. No. 10,963,773, which is a continuation-in-part of application No. 16/198,522, filed on Nov. 21, 2018, now Pat. No. 10,460,222.

(60) Provisional application No. 62/640,142, filed on Mar. 8, 2018, provisional application No. 62/590,117, filed on Nov. 22, 2017.

(51) Int. Cl.
*G06F 17/00* (2019.01)
*G06K 19/18* (2006.01)
*G06Q 20/38* (2012.01)
*G06K 19/06* (2006.01)
*G06K 7/14* (2006.01)

(52) U.S. Cl.
CPC ............ *G06K 19/18* (2013.01); *G06K 7/1452* (2013.01); *G06K 19/06037* (2013.01); *G06Q 20/382* (2013.01)

(58) Field of Classification Search
CPC ................. G06K 19/18; G06K 7/1452; G06K 19/06037; G06Q 20/382
USPC ........................................................ 235/375
See application file for complete search history.

(56) References Cited

U.S. PATENT DOCUMENTS

| | | | |
|---|---|---|---|
| 5,053,339 A | 10/1991 | Patel | |
| 6,544,925 B1 | 4/2003 | Prusik et al. | |
| 8,955,744 B2 | 2/2015 | Granucci et al. | |
| 10,460,222 B2* | 10/2019 | Staton | G06K 19/06037 |
| 10,963,773 B2* | 3/2021 | Staton | G06K 7/1452 |
| 2006/0095369 A1 | 5/2006 | Hofi | |

(Continued)

*Primary Examiner* — Ahshik Kim
(74) *Attorney, Agent, or Firm* — Avek IP, LLC

(57) ABSTRACT

A user instrument for engaging in a transaction includes a graphically encoded icon having a static portion, and an intrinsic portion comprising an area of stimuli-responsive material defining a first machine-readable indicia. At least a portion of the stimuli-responsive material transforms from a first state to a second state in response to a trigger. The transformation from the first state to the second state of the portion of the stimuli-response material results in a second machine-readable indicia. The transformation of the stimuli-responsive material from the first state to the second state is semi-irreversible. The second machine-readable indicia comprises information to permit or deny the user to engage in a second transaction via the user instrument.

20 Claims, 19 Drawing Sheets

(56) References Cited

U.S. PATENT DOCUMENTS

| | | |
|---|---|---|
| 2006/0278698 A1 | 12/2006 | Lovett |
| 2008/0043804 A1 | 2/2008 | Goldsmith et al. |
| 2009/0139907 A1 | 6/2009 | Hollingsworth et al. |
| 2013/0048736 A1 | 2/2013 | Wien |
| 2015/0310771 A1 | 10/2015 | Atkinson et al. |
| 2017/0169738 A1* | 6/2017 | David .................. G09F 3/0291 |
| 2017/0229000 A1 | 8/2017 | Law |

* cited by examiner

```
| | |___|___|___|___|||___|___|___|___|||__|___|___|___|___|___|___|
I  0   1   2   3   4   5   6   7   8   9   10  11  12
^                                       ^
Zero                                    Eight
```

FIG. 15

Row#

```
0 | | |___|___|___|___|___|___|___|___|___||__|___|___|___|___|___|___|
1 | | |___|___|___|___|___|___|___|___|___|___|___|___||__|___|___|___|
2 | | |___|___|___|___|||__|___|___|___|___|___|___|___|___|___|___|
3 | | |___|___|||__|___|___|___|___|___|___|___|___|___|___|___|___|

Col#0   1   2   3   4   5   6   7   8   9   10  11  12
            ^       ^               ^           ^
```

FIG. 16

GRAPHICALLY ENCODED ICONS HAVING INTRINSIC ATTRIBUTES EMBEDDED THEREIN AND SYSTEMS AND METHODS FOR USING SAME

CROSS-REFERENCE TO RELATED APPLICATIONS

This application is a continuation of U.S. patent application Ser. No. 16/667,552, filed Oct. 29, 2019, which is pending and which is continuation-in-part of U.S. patent application Ser. No. 16/198,522, filed Nov. 21, 2018, which granted as U.S. Pat. No. 10,460,222 on Oct. 29, 2019, and which claims priority to U.S. Provisional Patent Application No. 62/590,117, filed Nov. 22, 2017, and U.S. Provisional patent Application No. 62/640,142, filed Mar. 8, 2018, the disclosures of each of which are incorporated herein by reference in their entireties.

FIELD OF THE DISCLOSURE

The disclosure relates generally to the field of graphically encoded icons. More specifically, the disclosure relates to graphically encoded icons having intrinsic attributes embedded therein, and to systems and methods for using such graphically encoded icons.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

In one embodiment, a graphically encoded icon comprises a label attached to an object. The label includes a static portion and an intrinsic portion. The static portion has an area of machine-readable indicia. The intrinsic portion includes at least one area comprising a stimuli-responsive material. The stimuli-responsive material is configured to change from a first state to a second state in response to a trigger, and the change in state is based on an attribute about the object.

In another embodiment, a system for providing and responding to a visual indication of an attribute about an object includes a graphically encoded icon secured to an object and a computing device. The graphically encoded icon includes a static portion comprising static machine-readable indicia; and an intrinsic portion comprising at least one area comprising a stimuli-responsive material configured to change from a first state to a second state in response to a trigger. The change in state is based on an attribute of the object. The computing device includes a processor in data communication with an input device, an output device, and computer memory. The computer memory has a program having machine readable instructions that, when effected by the processor, performs the following steps: (a) determine the change in state of the stimuli-responsive material; (b) determine if the change in state has reached a predetermined threshold; and (c) if the change in state has reached the predetermined threshold, activate the output device to provide a controlled response to the change in state.

According to still another embodiment, a user instrument for engaging in a transaction includes a graphically encoded icon having a static portion, and an intrinsic portion comprising an area of stimuli-responsive material defining a first machine-readable indicia. At least a portion of the stimuli-responsive material transforms from a first state to a second state in response to a trigger. The transformation from the first state to the second state of the portion of the stimuli-response material results in a second machine-readable indicia. The transformation of the stimuli-responsive material from the first state to the second state is semi-irreversible. The second machine-readable indicia comprises information to permit or deny the user to engage in a second transaction via the user instrument.

In a further embodiment, a user instrument includes a graphically encoded icon having a static portion and an intrinsic portion comprising an area of stimuli-responsive material defining a first machine-readable indicia. At least a portion of the stimuli-responsive material transforms from a first state to a second state in response to a trigger. The transformation from the first state to the second state of the portion of the stimuli-response material results in a second machine-readable indicia. The transformation of the stimuli-responsive material from the first state to the second state is semi-irreversible.

In still a further embodiment, a security system includes a user instrument, a reader, and a signal generator. The user instrument is associated with a user and includes a graphically encoded icon which has an area of stimuli-responsive material defining a first machine-readable indicia. The reader is configured to read and decode the graphically encoded icon. The signal generator is configured to generate a signal operable to transform at least a portion of the stimuli-responsive material from a first state to a second state, wherein the transformation of the portion of the stimuli-responsive material results in a second machine-readable indicia. Each of the first machine-readable indicia and the second machine-readable indicia comprises information to permit or deny a user to engage in a transaction using the user instrument. If the reader determines that the respective machine-readable indicia comprises information to permit the user to engage in the transaction using the user instrument, the user is permitted to engage in the transaction.

BRIEF DESCRIPTION OF THE SEVERAL VIEWS OF THE DRAWINGS

Illustrative embodiments of the present disclosure are described in detail below with reference to the attached drawing figures and wherein:

FIG. 15 shows a one-dimensional graphically encoded icon according to still another embodiment of the invention.

FIG. 16 shows a two-dimensional graphically encoded icon according to still yet another embodiment of the invention.

DETAILED DESCRIPTION

The history of scanning, surveilling, dissecting, categorizing, decoding, and resolving information has been evolving for decades. There are many surveillance systems available today that are used for monitoring movement and identification of people or objects. Systems exist today that utilize fixed position observation as well as moving points of perspective. System input sources can range from a single camera to multiple points of observation. One exemplary way that surveillance systems have been used is in the tracking of inventory.

Up until the late 1800s, commercial establishments tracked their inventory primarily by hand. Such manual tracking of inventory was laborious and time consuming. Manual entry of large amounts of data and tracking thereof was also prone to error. Efforts were therefore made to develop machine readable indicia that could be used in large scale applications.

Punch cards, which typically comprised pieces of paper with holes punched therein, were invented in 1890 and allowed for inventory to be tracked more efficiently. Customers identified the products they had selected by removing the corresponding punch cards from a punch card catalog. The punch cards were then handed to the checkout clerk who passed the punch cards through a reader. The reader comprised an optical light and an optical sensor, and the punch card was placed in the reader such that the optical light and the optical sensor were on opposing sides of the card. If the optical sensor detected light passing through the card, i.e., through a hole punched therein, the reader would output a one; alternately, where the optical sensor detected no light, the reader would output a zero to indicate the absence of a punched hole.

Figure 1:
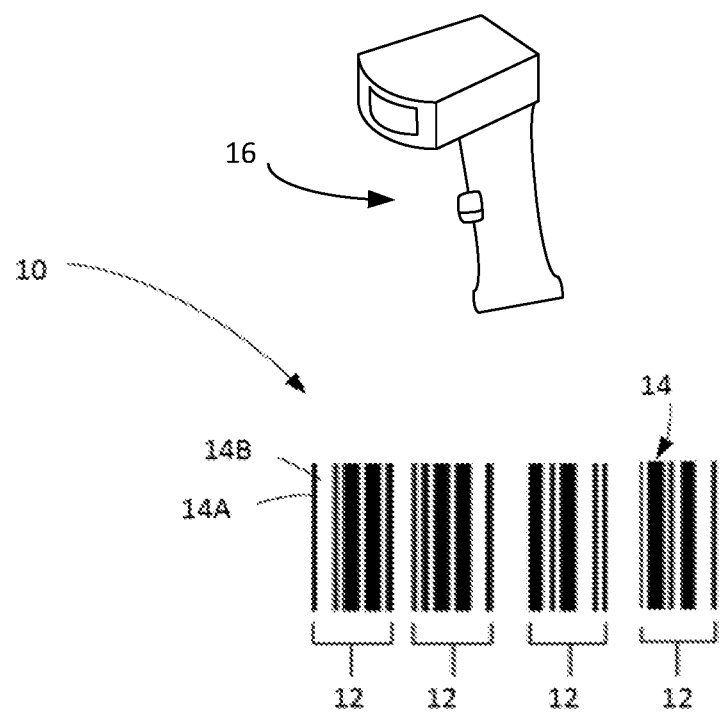
FIG. 1 shows a PRIOR ART one dimensional barcode together with a scanner therefor.

Barcode scanning systems, which are configured to identify and decode inanimate objects and markers, were then invented in the 1950s and revolutionized the way in which inventory was tracked. The planar perspective of these systems can be categorized into dimensional perspectives (e.g. one, two, three, and multi-dimensional). The more dimensions of planar perspective available, the greater the ability to resolve more reliable information and greater yields of meaningful intelligence. FIG. 1 shows an example of a one-dimensional barcode 10 as is known in the art. The prior art example barcode 10 includes a plurality of slots 12. Each slot 12 contains a predefined number of stripes 14, including both black stripes 14A and white stripes 14B. All slots 12 have the same width, and all stripes 14 have the same width. A unique pattern of black and white stripes is associated with each digit from zero to nine. For example, one digit may be represented by two white stripes, two black stripes, two white stripes, and one black stripe, whereas another digit may be represented by two white stripes, one black stripe, two white stripes, and two final black stripes, etc. The barcode 10 is readable by a barcode scanner 16. The scanner 16 shines LED, laser, projector, photonic semiconductor or other light onto the barcode 10. Light reflects back off barcode 10 into a light-detecting electronic component of the scanner 16, e.g., a photoelectric cell thereof. White stripes 14B reflect more light as compared to the black stripes 14A, which allows the scanner 16 to quickly decode the code. As the scanner 16 moves past the barcode 10, the cell generates a pattern of on-off pulses that correspond to the black and white stripes. An electronic circuit attached to the scanner 16 converts these on-off pulses into binary digits (zeros and ones) to decode the barcode 10.

Barcode 10 is typically referred to as a one dimensional or linear barcode. This is because the information in the code is organized horizontally and is read from left to right. The data in a one-dimensional barcode 10 is limited in practice because addition of data thereto requires an increase in the physical length of the barcode 10. It is this limitation of the one-dimensional barcode that in the late 1980s led to the advent of two dimensional barcodes.

Two dimensional barcodes, such as a Quick Response (QR) code, a Datamatrix code, a PDF417 code, an Aztec code, etc., are configured to hold information in both the vertical and horizontal directions. Data is encoded in such two-dimensional barcodes in patterns, matrices, squares, hexagons, dots, and other shapes. Because the data is encoded in both the vertical and horizontal directions, a two-dimensional barcode can store much more information (e.g., 200 times more information) as compared to a similarly sized one dimensional barcode.

Figure 2:
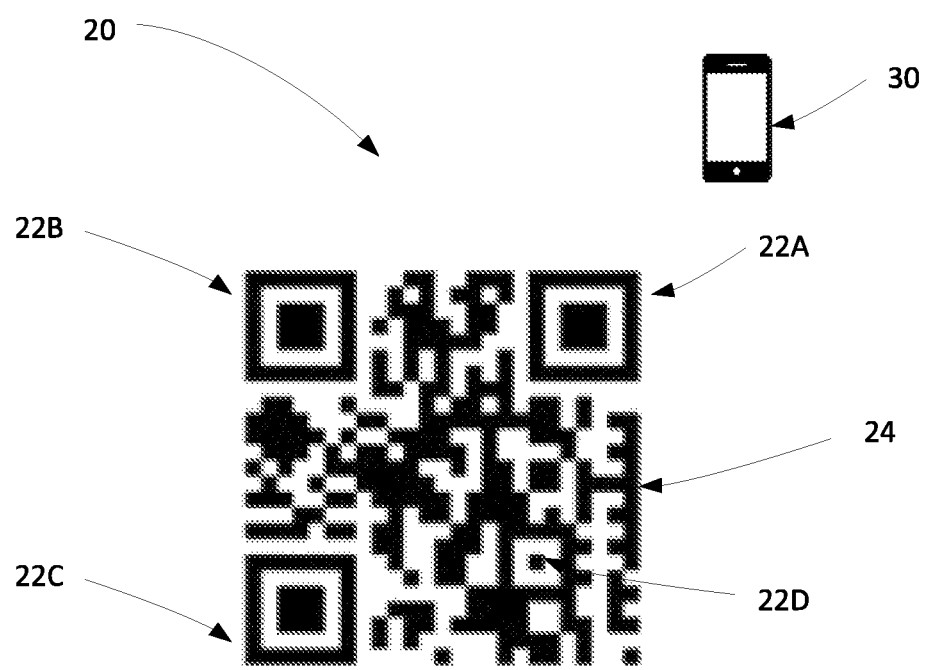
FIG. 2 shows a PRIOR ART two-dimensional barcode together with a scanner therefor.

FIG. 2 shows a QR code 20 as is known in the art. Each QR code includes modules that contain static information required to read the QR code 20. For example, the illustrated QR code 20 includes three edge modules 22A, 22B, and 22C (i.e., the three large squares) which tell the scanner where the edges of the QR code 20 are, and an alignment marker 22D that acts as reference points for the scanner. The QR code 20 also contains other modules and zones, such as timing pattern markers to define the positioning of the rows and columns, formatting markers to outline whether the QR code 20 contains numbers, text, symbols, or some combination thereof, a quiet zone, etc. Data and error correction information is encoded in a data encoding portion 24 of the QR code 20. As is known, QR code 20 can be read using a smart phone 30 or another device having an imager. To read the QR code 20, the imager of the QR code reader 30 is used to capture an image of the QR code 20. The processor of the QR code reader 30 then decodes the image and converts it into information meaningful to humans.

Machine readable indicia, such as the barcode 10 and the QR code 20, can be read by computing systems quickly (as compared to Arabic numerals, for example). However, humans are typically unable to decipher such machine-readable indicia using the naked eye. To this end, machine readable indicia may be accompanied with static information that can be readily comprehended by the naked eye. For example, the barcode 10 may include at the bottom (or elsewhere) a sequence of Arabic numerals, Greek numerals, Chinese numerals, etc. that corresponds to the machine-readable indicia of the barcode 10 and allow the barcode 10 to be read both by humans and by machines. Or, for instance, where machine readable indicia on the QR code 20 translates to a product code containing letters of the English alphabet, these letters may be listed underneath the machine-readable indicia to allow a human to comprehend the information stored in the QR code 20 with the naked eye.

Associating machine-readable indicia with static human readable indicia has several benefits. For example, if the barcode 10 or QR code 20 is deformed or is otherwise rendered unreadable by a computing system, a user may read the static human readable information provided with the barcode 10 and the QR code 20, respectively, and manually enter same into the computing system (e.g., a point of sale or other system). The static human readable information may also be used for error detection and correction, validation of the machine-readable data, security, encryption, etc.

While the one-dimensional barcodes represent a significant advance over the punch cards of old and the two-dimensional barcodes represent a significant advance over one-dimensional barcodes, the prior art one and two-dimensional barcodes are limited in that the information represented thereby is static. That is, once the prior art barcode 10 and the prior art QR code 20 are printed, they become fixed in form and cannot be used to convey variable information. As discussed herein, machine-readable indicia that includes both static and variable information can have wide ranging applicability. This is particularly so when the variable information conveyed by the machine-readable indicia: (a) is tied to an intrinsic attribute, e.g., of an object associated with the machine readable indicia; and/or (b) can be readily comprehended both by the naked eye and by computing systems.

Figure 3A:
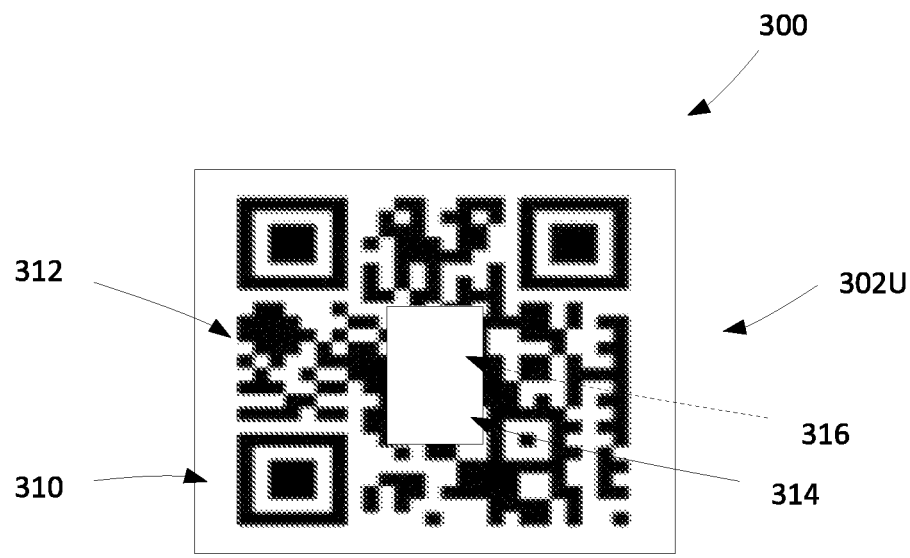
FIG. 3A shows a top side of a label having a graphically encoded icon according to an embodiment of the present disclosure.
Figure 3B:
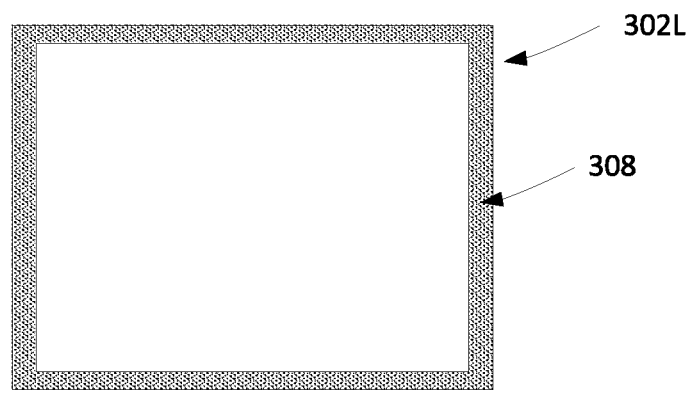
FIG. 3B shows a bottom side of the label of FIG. 3A.

Focus is directed to FIGS. 3A and 3B, which respectively show an upper surface 302U and a lower surface 302L of a label 300 according to an embodiment of the present disclosure. The lower surface 302L of the label 300 may include an adhesive 308, e.g., at the edges there of or elsewhere, to allow the label 300 to be permanently or removably adhered to an object.

The upper surface 302U of the label may contain a graphically encoded icon 310. In an embodiment, the graphically encoded icon 310 is configured to be deciphered by a machine (e.g., a bar code scanner, an imager, etc.) in its entirety and portions thereof are further configured to readily convey meaningful information about an attribute of an object associated with the label 300 to the naked eye. In some embodiments, a portion of the graphically encoded icon 310 is configured to be deciphered by a machine, another portion of the graphically encoded icon 310 is configured to convey information to the naked eye, and yet another portion of the graphically encoded icon 310 is readable by a machine and is further configured to convey meaningful information about an attribute of an object associated with the label 300 to the naked eye.

In the illustrated example, the graphically encoded icon 310 includes a static portion 312 and an intrinsic attribute portion 314. The static portion 312 comprises static machine-readable indicia, such as a traditional one-dimensional barcode, a traditional two-dimensional barcode, a three-dimensional barcode, etc. In embodiments, the static portion 302 may also include information readily decipherable by the naked eye; for example, where the static portion 302 is a two-dimensional barcode, the static portion 302 may include a listing of numerals, alphabets, etc. that corresponds to the static machine-readable indicia.

The intrinsic attribute portion 314 may, in embodiments, be fully or partially encapsulated by the static portion 312. The intrinsic attribute portion 314 may be configured to convey information about an attribute of an object to which the label 300 is adhered. In embodiments, indicia in the intrinsic attribute portion 314 may be machine readable and may further be configured to convey meaningful information about the attribute of the object associated with the label 300 to the naked eye.

In embodiments, indicia in the intrinsic attribute portion 314 may change states based on a trigger. For example, in embodiments, indicia in the intrinsic attribute portion 314 may initially appear invisible to the naked eye and to the scanner (e.g., a computing system having an imager), and may thereafter change states based on a trigger to convey meaningful information about an attribute associated with an object to which the label 300 is adhered.

In embodiments, the intrinsic attribute portion 314 may include stimuli-responsive polymers 316 and/or other such materials that exhibit a change in a characteristic thereof in response to a known stimulus. The change effectuated by the trigger may be one that is discernible by the naked eye. For example, the intrinsic attribute portion 314 may, in embodiments, include thermochromic (i.e., temperature sensitive ink) that changes colors based on temperature. Or, for instance, the intrinsic attribute portion 314 may contain smart polymers and smart polymer solutions that exhibit a visible change based on factors such as humidity, pH, the wavelength and/or intensity of impinging light, an electrical field, a magnetic field, etc. The artisan understands that smart polymers, e.g., poly propyl (acrylic acid), poly (ethacrylic acid), PMMA-PEG copolymer, polysilamine, poly(4-vinylpyridine), poly(2-vinylpyridine), poly(2-diethylaminoethyl methacrylate), etc., which exhibit a visible change based on their environment are commercially available in the marketplace today and that much research is underway to develop additional stimuli-responsive materials. The stimuli-responsive polymers 316 used in the present disclosure may, in embodiments, respond to one or more such factors by altering their color, transparency, or other physical attributes.

In embodiments, the response of the stimuli-responsive polymers in the intrinsic attribute portion 314, once triggered by the triggering stimulus, may be permanent. Such stimuli-responsive polymers may be referred to herein as irreversible stimuli-responsive polymers. In other embodiments, the response of the stimuli-responsive polymers may be reversible. Such stimuli-responsive polymers may be referred to herein as reversible stimuli-responsive polymers. Consider, for example, a stimuli-responsive polymer that is initially transparent to the naked eye but changes color, e.g., changes from being transparent to appearing in a red hue, when the environment in which it is located reaches a temperature equal to or greater than a triggering temperature $T_{trigger}$. If this example polymer can respond to the stimulus more than once, e.g., turns red when the temperature reaches $T_{trigger}$ and turns transparent again after the temperature reaches below $T_{trigger}$, it may be referred to herein as a reversible stimuli-responsive polymer. Alternately, if this polymer maintains its changed state once the response is triggered notwithstanding any other changes in the environment, e.g., if the polymer turns red when the temperature reaches $T_{trigger}$ and remains red even when the temperature goes below $T_{trigger}$, it may be referred to herein as an irreversible stimuli-responsive polymer. It shall be understood that the stimuli-responsive polymer may be irreversible under normal operating conditions, yet be reversed in response to a controlled stimulus (e.g., to "reset" the polymer). Thus, the stimuli-responsive polymer may be semi-irreversible in certain embodiments. Depending on the application, embodiments of the present disclosure may employ a reversible stimuli-responsive polymer, an irreversible stimuli-responsive polymer, a semi-irreversible stimuli-responsive polymer, or any combination of the three.

The graphically encoded icons disclosed herein, e.g., the graphically encoded icon 310, may have wide ranging applicability, and may be employed in any application where it is desirable to readily convey an intrinsic attribute of an object associated with the graphically encoded icon 310 to the naked eye and/or to a machine.

Assume, for example, that containers carrying seafood (e.g., shrimp) from various locations are shipped to another location (e.g., to a warehouse). As is known, shrimp is preferably stored at a temperature of −22 degrees Fahrenheit. In the prior art, a one or two-dimensional barcode may be adhered to each of the various containers. The prior art barcodes may outline, e.g., the shipping location, the location of the ultimate recipient, the product code associated with the shrimp, and other such information. The prior art barcodes, however, do not outline whether the shrimp container was maintained at a desirable storage temperature during transit.

Figure 4A:
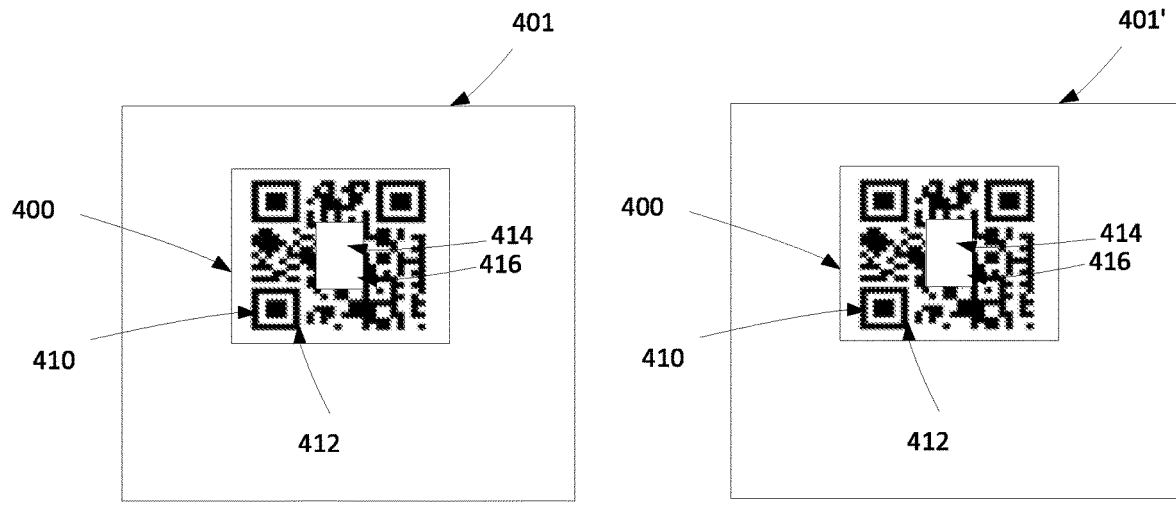
FIGS. 4A-4B show a top side of labels having a graphically encoded icon of the type shown in FIG. 3A.

FIG. 4A shows example shrimp containers 401 and 401' that are to be shipped form a shipping location to a recipient. The example containers 401 and 401' are each shown as having a label 400 adhered thereto. Label 400 is an example of the label 300 and includes a graphically encoded icon 410 of the type shown in FIGS. 3A and 3B. The graphically encoded icon 410 includes a static portion 412 containing static machine-readable indicia and an intrinsic attribute portion 414 encapsulated by the static portion 412. In embodiments, care may be taken to ensure that the intrinsic attribute portion 414 is in the data encoding portion of the graphically encoded icon (e.g., in embodiments, the intrinsic attribute portion 414 does not cover the edge modules, the alignment markers, etc.). Such may ensure that the indicia in the static portion 412 and the intrinsic attribute portion 414 is readable by a machine.

In this example, the intrinsic attribute portion 414 contains an irreversible (or semi-irreversible) stimuli-responsive polymer 416 configured to change its state when the temperature of the environment exceeds −22 degrees Fahrenheit (or another temperature). That is, the trigger in this example is a maximum temperature $T_{trigger(max)}$. As discussed herein, in other embodiments, the trigger may be a minimum temperature or another factor. The irreversible stimuli-responsive polymer 416 may initially appear transparent and may change to black, red or a different hue when the temperature of the environment exceeds −22 degrees Fahrenheit.

Figure 4B:
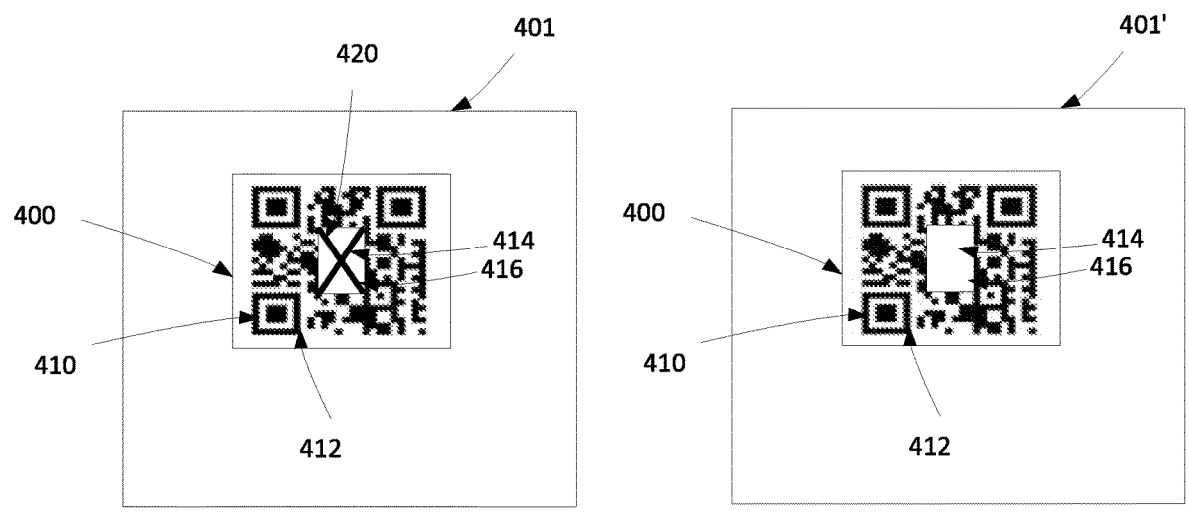

FIG. 4B shows the example shrimp containers 401 and 401' as received by the recipient. The label 400 on the container 401, and particularly the intrinsic attribute portion 414 thereof, now displays a trigger notification 420 (an X in this example). The trigger notification 420 apprises the recipient that the shrimp container 401, during transit or at another time, was placed in an environment where the temperature exceeded −22 degrees Fahrenheit. The recipient may therefore easily observe that the shrimp in the container 401 may be spoiled. Such may allow the recipient to discard the shrimp container 401 without having to open the container 401. Conversely, the intrinsic attribute portion 414 of the container 401' shown in FIG. 4B does not display the trigger notification 420. The recipient may therefore definitively observe that the shrimp container 401' was maintained at a proper temperature during transit.

Figure 18:
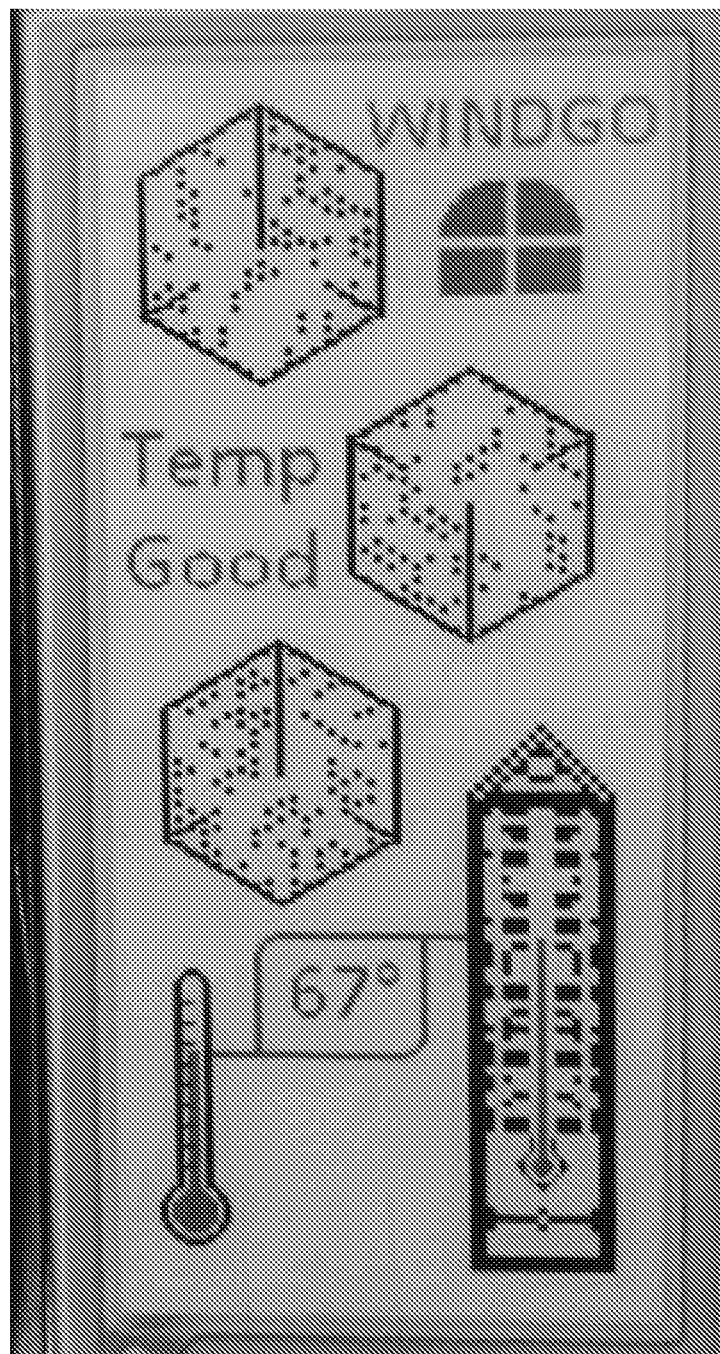
FIG. 18 shows a plurality of graphically encoded icons incorporated into a label according to yet another embodiment of the invention.

The trigger notification 420, shown as an X in FIG. 4B, may in embodiments be a different visible notification. For example, in embodiments, the trigger notification 420 may comprise the text "S" for spoiled. Or, for instance, the trigger notification 420 may be a square, circle, dashed line, or other shape or pattern that is visibly manifested when the trigger condition is met. As noted, the trigger notification 420 may, in embodiments, be machine readable. For example, in embodiments, a computing system having an imager may be configured to decode the trigger notification 420 to determine whether the shrimp in the various shrimp containers is spoiled. In these embodiments, a human may optionally verify the results using the naked eye. For instance, all shrimp containers flagged by the computing system as potentially containing spoiled shrimp may be routed to an inspection area, and personnel may visually inspect these containers to ensure that the trigger notification 420 has not been identified by the computing system in error. Such may allow for the verification of spoilage of goods with greater accuracy without having to inspect the goods themselves. FIG. 18 illustrates a label having a plurality of graphically encoded icons with machine readable and human readable information, including indicating that the temperature is within an acceptable range for the application. Thus, a user can easily verify that the temperature is acceptable, and this may be further confirmed by the machine-readable indicia.

While the label 400 containing the graphically encoded icon 410 is illustrated above for a particular application (i.e., for shrimp containers), the artisan will understand from the present disclosure that labels having graphically encoded icons disclosed herein may be used in other applications where it is desirable to determine whether a trigger condition is met. For example, in an embodiment, a label having a graphically encoded icon of the type shown in FIGS. 3A-3B may be configured such that the intrinsic attribute portion 314 displays a trigger notification when the temperature equals or exceeds a particular temperature $T_{trigger(max)}$. For instance, in an example application, the $T_{trigger(max)}$ may be 32 degrees Fahrenheit (or another temperature), and this label may be placed on paint containers. If the intrinsic attribute portion displays a trigger notification, such may indicate that the paint in the container has undergone at least one freezing cycle and is likely unfit for use. The label may therefore facilitate the discarding of unusable paint without having to open the container in which the paint is housed.

The graphically encoded icons 310 having an irreversible stimuli-responsive polymer may serve, in effect, as single use or permanent memory. The graphically encoded icons 310 having a semi-irreversible stimuli-responsive polymer may serve, in effect, as semi-permanent memory during normal operating conditions. These graphically encoded icons 310 may be used, e.g., in applications where the relevant question is whether the trigger condition was met at some point in time; the current state of the environment, conversely, is unimportant. For example, if the label 400 is placed on a shrimp container that has at one time (e.g., a day before, an hour before, etc.) been placed in an environment in which the temperature exceeds $T_{trigger(max)}$, it may not matter than the shrimp container is currently in a suitable environment. In other embodiments, the graphically encoded icon 310 may have a reversible stimuli-responsive polymer, and may serve, in effect, as volatile memory. In these applications, the focus may be on the current state of the environment and it may be unimportant to determine whether the trigger condition was previously met.

For example, in embodiments, the intrinsic attribute portion 314 of the graphically encoded icon 310 may comprise a reversible stimuli-responsive polymer, and this graphically encoded icon 310 may be placed, via a label or otherwise, on bottles of water or other such non-perishable drinks in a restaurant. The stimuli-responsive polymer may be configured to exhibit a visible change when the temperature of the environment goes above 50 degrees Fahrenheit (i.e., in this example, the trigger is a maximum temperature and the value of $T_{trigger(max)}$ is 50 degrees Fahrenheit (or a different temperature). For instance, the stimuli-responsive polymer may appear to be transparent until the temperature reaches $T_{trigger(max)}$, at which point its hue may change to red (or another color). When the bottle of water is to be served to a customer, the server at the restaurant may visibly inspect the graphically encoded icon 310, and where the intrinsic attribute portion 314 thereof is transparent, the server may easily observe that the water is appropriately cold and may be served to the customer. Alternately, if the intrinsic attribute portion 314 appears red, the server may determine that the bottled water is not suitably cold and should not be served to the customer. The server may therefore place the bottle of water in a refrigerator or ice bucket and serve it to a customer when the reversible stimuli-responsive polymer in the intrinsic attribute portion 314 appears transparent. If the intrinsic attribute portion 314 of the graphically encoded icon turns transparent and subsequently turns red again, the server may place the bottle in the refrigerator once again. And so on.

Such graphically encoded icons 310 may likewise be used on bottles of water (or other drinks) being served in a vending machine. The vending machine may contain a computing system having an imager or other scanner, and the computing system may vend a bottle of water only if the graphically encoded icon 310 associated therewith appears transparent. Conversely, if the graphically encoded icon 310 associated with a bottle of water in the vending machine is red, the vending machine may vend a different bottle of water to a user; alternately, the vending machine may apprise the user that cold bottled water is currently unavailable for purchase.

In embodiments, the intrinsic attribute portion 314 of the graphically encoded icon 310 may comprise a reversible stimuli-responsive polymer configured to change its state when the temperature goes below a certain temperature $T_{trigger(min)}$. Such a graphically encoded icon 310 may, for example, be associated with coffee, tea, or other drinks to ensure that these drinks, when served, are appropriately hot.

In some example embodiments discussed above, the graphically encoded icon 310, and particularly the intrinsic attribute portion 314 thereof, may employ Boolean logic. That is, the intrinsic attribute portion 314 may have a binary value. For example, if the intrinsic attribute portion 314 contains an irreversible stimuli-responsive polymer that is configured to change its state when a trigger condition is met, the intrinsic attribute portion 314 will either: (a) appear in one (e.g., a changed) state if the trigger condition is met; or (b) appear in another (e.g., an original) state if the trigger condition is unmet. Similarly, if the intrinsic attribute portion 314 contains a reversible stimuli-responsive polymer, the intrinsic attribute portion 314 will either: (a) appear in one (e.g., a changed) state if the trigger condition is currently being met; or (b) appear in another (e.g., an original) state if the trigger condition is currently unmet. In some embodiments of the present disclosure, and as discussed in more detail herein, the intrinsic attribute portion 314 may employ many-valued logic (as opposed to Boolean logic). For example, in embodiments, the intrinsic attribute portion 314 may comprise a fuzzy field that may be in one state at one time, a second state at another time, a third state at yet another time, and so on. In other embodiments still, the intrinsic attribute portion 314 may comprise each of a binary field and a fuzzy field.

Figure 5:
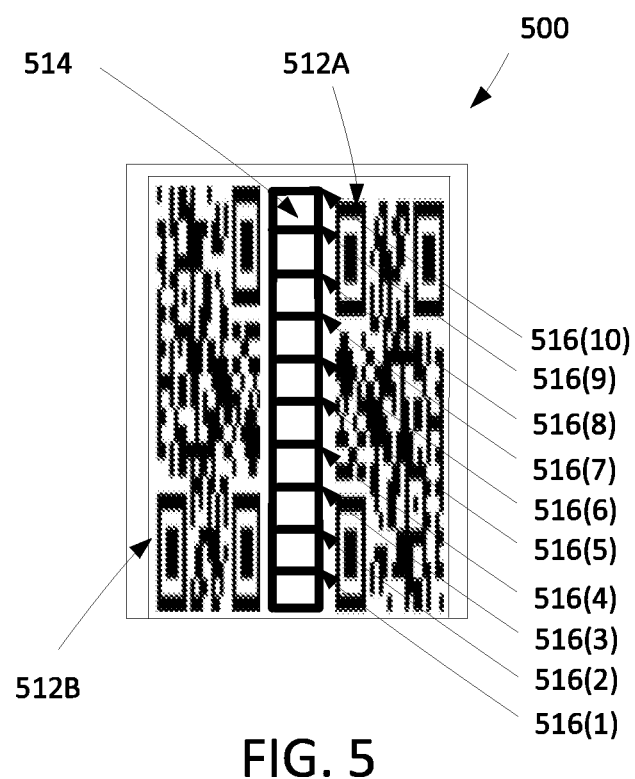
FIG. 5 shows a top side of a label having a graphically encoded icon comprising a fuzzy field, according to an embodiment.

FIG. 5 shows a top side of a label 500, which is another example of the label 300. The label 500 includes a graphically encoded icon 510 comprising static portions 512A and 512B. The static portions 512A and 512A each include static machine-readable indicia. The illustrated graphically encoded icon 510 includes an intrinsic attribute portion 514, which may be situated between the static portions 512A and 512B or elsewhere. In embodiments, the graphically encoded icon 510 may include a solitary static portion 512 and a solitary intrinsic attribute portion 514. In other embodiments, the graphically encoded icon 510 may include a plurality of intrinsic attribute portions 514 and a solitary static portion 512.

The illustrated intrinsic attribute portion 514 may be a fuzzy field. The illustrated fuzzy field 514 has ten possible levels 516(1) to 516(10), although any number of levels may likewise be employed. The fuzzy field levels may but need not be visibly demarcated. As discussed herein, the fuzzy field 514 may, in embodiments, be configured to be "filled in" by a substance. That is, in some embodiments, the intrinsic attribute portion 514 may be configured to directly delineate a quantity of a substance in a container to which the label 500 is adhered. The substance may be a solid (e.g., candies, powdered salt, etc.), liquid (e.g., oil, coffee drinks, water, etc.), or gas (e.g., chlorine, nitrogen dioxide, etc.) that is visible to the naked eye. The fuzzy field 514 may (but need not) be transparent or generally transparent so as to allow the level of a substance to be ascertained as discussed herein.

Figure 6A:
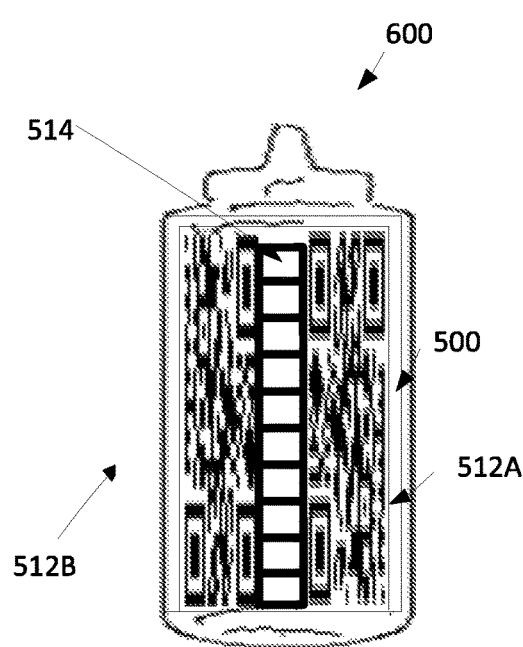
FIGS. 6A-6C each show a container with the label of FIG. 5 disposed thereon.
Figure 6B:
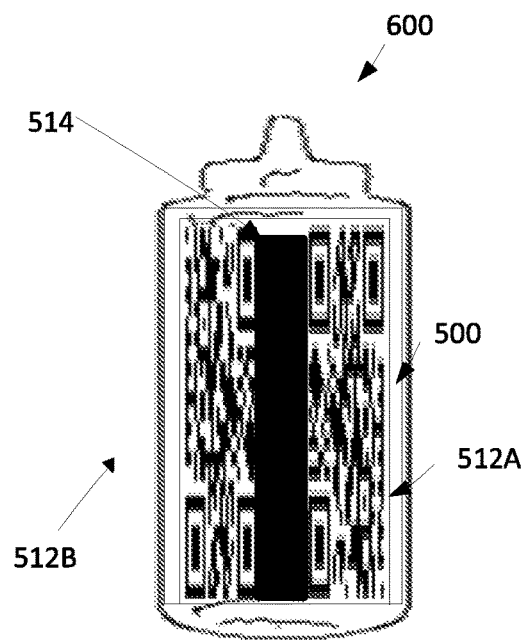
Figure 6C:
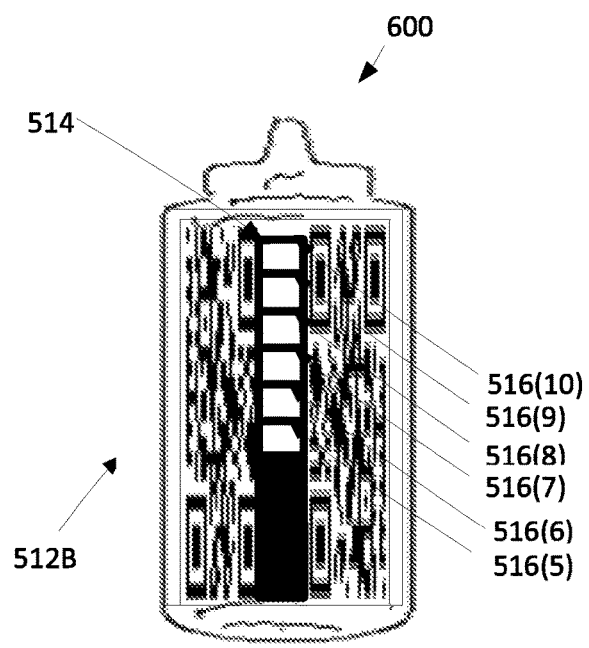

FIGS. 6A-6C show one example application of the label 500. Assume, for example, that an entity (e.g., a commercial establishment such as a restaurant, a household, etc.) carries in a refrigerator or elsewhere a container 600 of salad dressing. Assume further that the entity wishes for additional salad dressing to be ordered when the level of salad dressing in the container 600 falls below a certain level (e.g., falls below the midway point). FIG. 6A shows the container of salad dressing 600 with the label 500 adhered thereto. The container 600 shown in FIG. 6A has no salad dressing therein. FIG. 6B, conversely, shows the container 600 when it is generally full of salad dressing. And FIG. 6C shows the container 600 that is only partially full.

The refrigerator (or the cupboard, kitchen, or other location) in which the container 600 is housed may contain or have associated therewith a computing system having an imager. The imager may be configured to capture an image of the container 600 periodically (e.g., once a day, once a week, etc.). The computing system may decode the graphically encoded icon 510 of the label 500, and particularly the fuzzy field 514 thereof, to determine whether additional salad dressing is to be ordered. For example, when the imager captures an image of the container 600 in FIG. 6C, the computing system may determine that the level of salad dressing in the container 600 has fallen below a midway point. The computing system may be in communication with a network and use same to order an additional salad dressing container (e.g., the computing system may be in communication with the world wide web and use same to automatically order another salad dressing from a grocery store). Or, for instance, the computing system may alert the user that a new salad dressing container is needed and/or add a salad dressing container to a grocery list communicated to the user. Alternately, when the imager captures an image of the container 600 in FIG. 6B, the computing system may determine that ordering of an additional salad dressing container is not yet required. In this way, the label 500, and specifically the fuzzy field 514 thereof configured to be filled in by a substance (salad dressing in this example), may ensure that the entity maintains the required supply of salad dressing. The artisan will appreciate that containers of salad dressing are but one example, and that the fuzzy field 514 may likewise be used to track the quantity of other substances (e.g., milk in a refrigerator, oil in an oil tank, salt in a salt shaker, ketchup in a bottle, lotion in a tube, lint in a dryer, toner in a printer, etc.).

From time to time, the fuzzy field output may be between two discrete levels, e.g., may be between level 516(5) and 516(6). In embodiments, the computing system may be configured to round the output up or down by ascertaining whether the output is closer to level 516(5) or level 516(6). In other embodiments, an output between two levels may always be rounded up or be rounded down.

Figure 7:
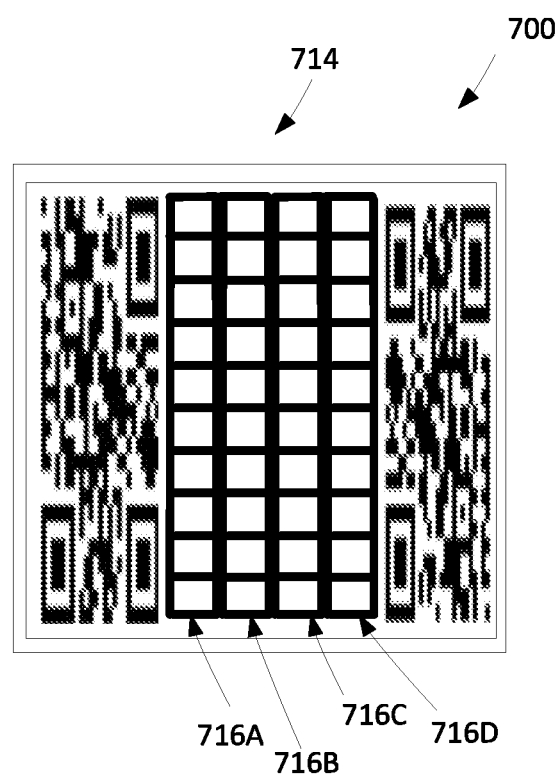
FIG. 7 shows an alternate embodiment of the label of FIG. 5 comprising a two-dimensional fuzzy field.

The fuzzy field 514 of the label 500 illustrated in FIG. 5 is one dimensional. In other embodiments, the fuzzy field may be two dimensional, three dimensional, etc. FIG. 7 shows a label 700 that is an example of the label 300. The label 700 has an intrinsic attribute area that contains a fuzzy field 714 arranged as a two-dimensional matrix. The illustrated two-dimensional matrix has ten rows and four columns 716A-716D.

In embodiments, each column 716A-716D may be adapted to convey the same information and thus provide a mechanism to verify the reading of one of the columns 716A-716D. For example, the label 700 may be placed on the salad dressing container of FIGS. 6A-6C and the computing system may order a new salad dressing container if at least three of the four columns 716A-716D indicate that the salad dressing in the container has fallen below the midway point (or another level). Assume, for instance, that the salad dressing container is generally empty but that a portion of salad dressing is stuck to the container walls, e.g., at level 8 of column 716A. If the fuzzy field 514 were one dimensional and contained only column 716A, the computing system may have erroneously determined that the salad dressing in the container is at level 8, and consequently, no salad dressing would have been ordered. The plurality of fuzzy field columns 716A-716D may ensure that an accurate assessment of the quantity of salad dressing in the container is obtained notwithstanding the faulty reading of column 716A.

In embodiments, the computing system may be configured to average the readings from the multiple columns 716A-716D, and the decision based thereon (e.g., the decision to order a new salad dressing container) may be based on this average. In other embodiments, integration and time stabilizing techniques may be used to normalize the fuzzy field outputs.

In embodiments, at least two of the columns 716A-716D may be configured to convey different information. For example, column 716A may be configured to convey an amount of a substance and another column 716D may be configured to convey whether a trigger condition is met (e.g., whether the temperature is below a certain temperature $T_{trigger(min)}$. The multiple columns 716A-716D may be provided with different colors that are printed using the same or different printing techniques.

Figure 8A:
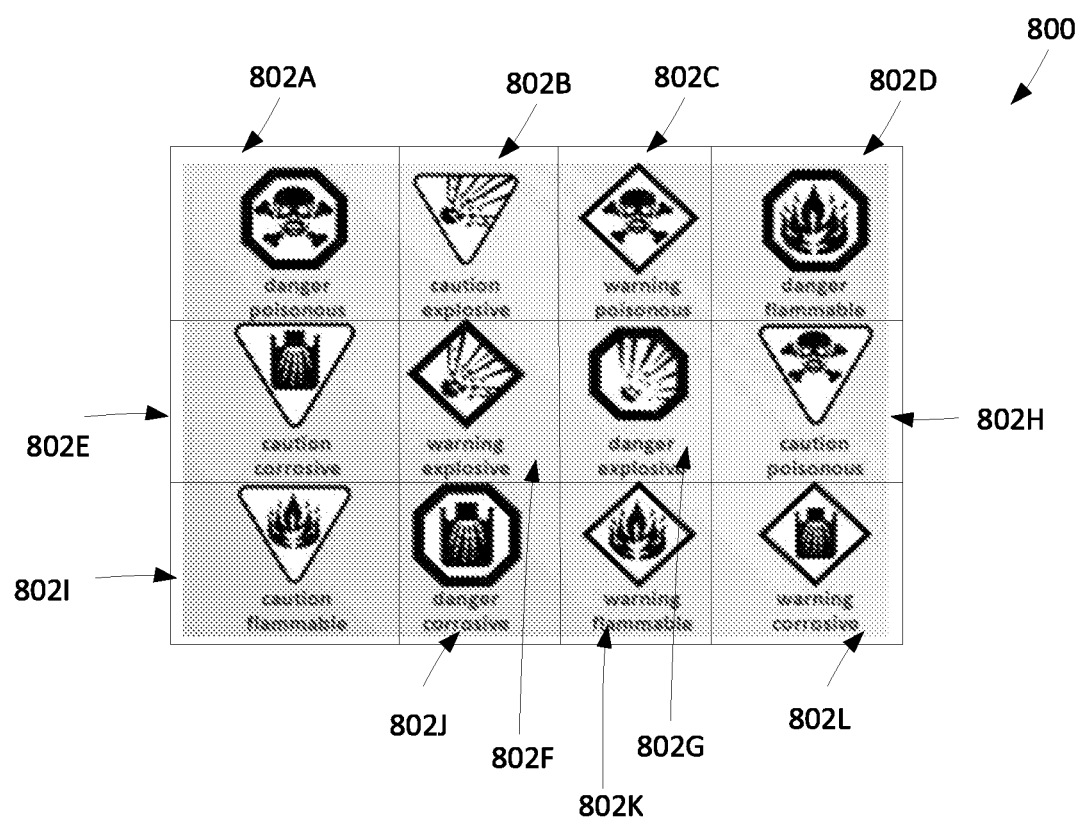
FIG. 8A-8B show a label having sections that are configured to be manually triggered.

FIG. 8A shows a label 800 that is an alternate embodiment of the label 300. The label 800 is substantially similar to the embodiment 200, except as specifically noted and/or shown, or as would be inherent. Further, those skilled in the art will appreciate that the embodiment 300 (and thus the embodiment 800) may be modified in various ways, such as through incorporating all or part of any of the various described embodiments, for example. For uniformity and brevity, corresponding reference numbers may be used to indicate corresponding parts, though with any noted deviations.

Figure 8B:
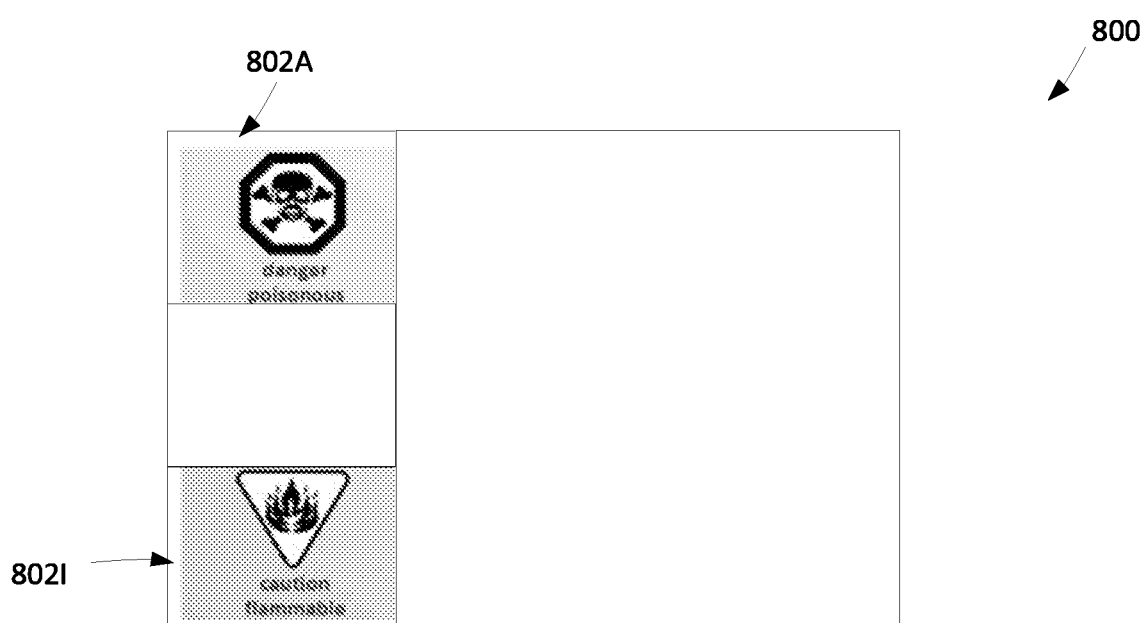

The example label 800 is shown as having a plurality of sections 802A-802L. Each section 802A-802L may be configured to convey distinct information. For example, in the illustrated example, section 802A conveys that a substance is extremely poisonous, section 802B conveys that a substance is relatively explosive, section 802C conveys that a substance is fairly poisonous, and so on. The trigger for each section 802A-802L may (but need not) be the same. In this embodiment, the trigger event may be one that is configured to be applied manually (i.e., the trigger event may be unlikely or impossible to occur on its own). For example, the trigger may be a temperature of 150 degrees Fahrenheit or another such trigger. Each section 802A-802J may initially be transparent, but may become visible when the trigger is applied thereto. For example, FIG. 8B shows the label 800 in which sections 802A and 802I are manually triggered whereas the remaining sections appear invisible to the naked eye.

The manually triggerable sections 802A-802I may allow a user to use the label 800 to convey different information at different times. For example, the label 800 may be placed on a truck that typically carries hazardous materials. If the material currently being carried by the truck is highly poisonous and relatively flammable, only sections 802A and 802I may be triggered and the remaining sections may appear blank to the naked eye. Similarly, if a different material is being transported, the appropriate sections may be triggered and the remaining sections may remain deactivated. The warning indicia in each section 802A-802I may be maintained in its changed state using electronics or other means. In order to maintain standards throughout the industry, the Department of Transportation has indicia (or labels) that are acceptable for each potential attribute of a hazardous material. Accordingly, the warning indicia revealed (or activated) for the material may be an approved Department of Transportation indicium (or label) for the particular attribute of the hazardous material in order to avoid confusion.

Figure 10:
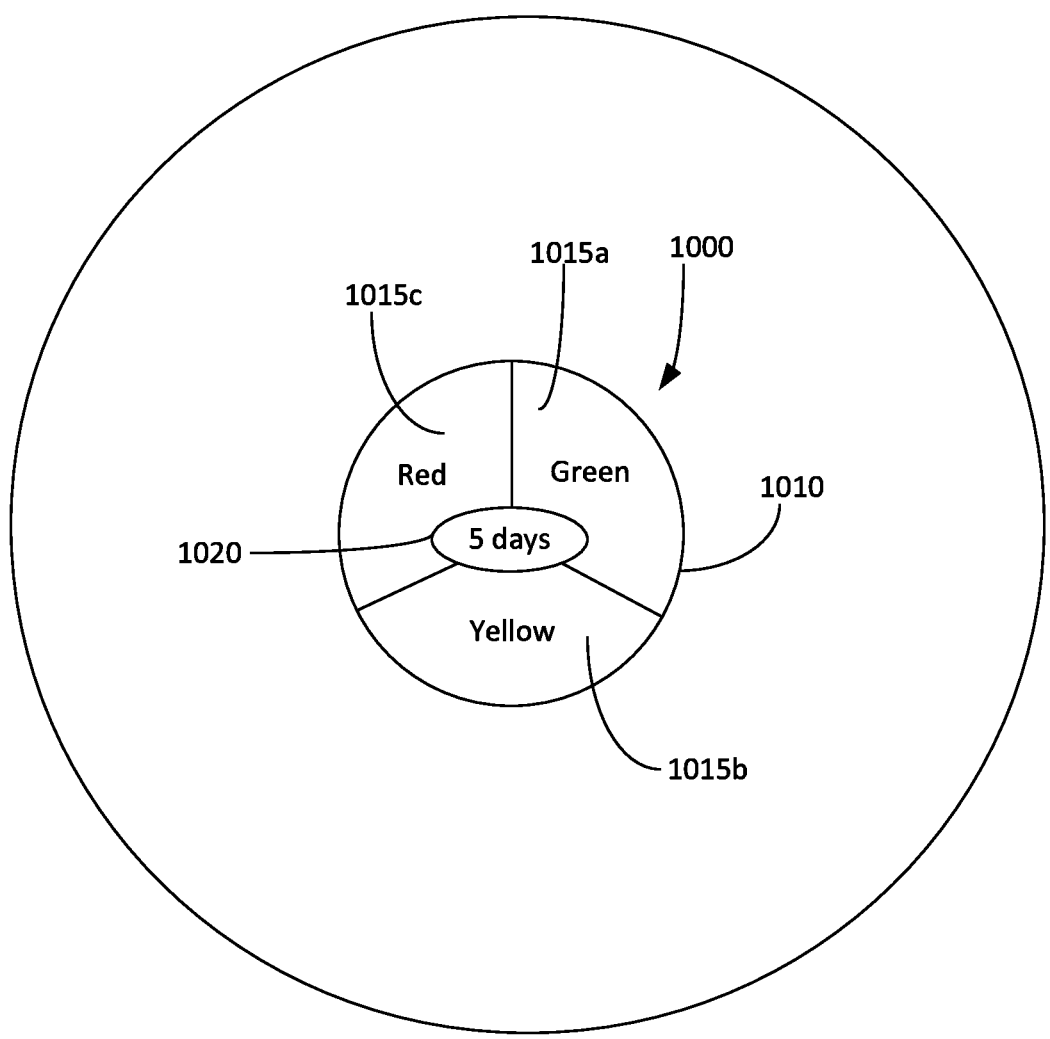
FIG. 10 shows an embodiment of a label disposed on a container.

In embodiments, it may not be necessary for the label to carry machine readable indicia. Rather, the label may be singularly configured to provide meaningful information about an attribute of an object associated with the label to the naked eye. FIG. 10 shows a label 1000 according to an embodiment of the invention. The label 1000 is substantially similar to label 300 except as is shown and described. The label 1000 includes a graphically encoded icon 1010 having a one or more portions 1015a, 1015b, 1015c (generally 1015), and each portion may include stimuli-responsive particles which may be embedded, for example, in a laminate or other transparent material. In one embodiment, each of the portions 1015 may have a plurality of static programmable electrochromic ("SPEC") non-volatile particles (hereinafter referred to as "SPECink") distributed within the portion 1015 configured to change a particular color upon a triggering event. In another embodiment, each portion 1015 has a SPECink distributed therein, wherein each portion is configured to change to a different color upon a triggering event.

In FIG. 10, the label 1000 is configured for use on a container for holding leftover food (although the label 1000 may be used on other containers as well, and the container may hold items other than food). Here, the graphically encoded icon 1010 is divided into three portions 1015a, 1015b, and 1015c. Each of the portions 1015a, 1015b, and 1015c is coated (or partially coated, e.g., in a pattern) in stimuli-responsive SPECink particles 1100 (FIG. 11) that changes a color based on a triggering event. Each of the portions 1015a, 1015b, and 1015c selectively change to a different color based on the triggering event. For example, portion 1015a may be selectively green. Portion 1015b may be selectively yellow. And portion 1015c may be selectively red. Optionally, a central portion 1020 is configured as a display (or user interface) for providing information to a user.

The SPEC particles 1100 may form a non-volatile, semi-permanent SPECink that responds to a stimulus (e.g., electrical, magnetic, etc.) causing the particles to switch between a first colored-state and a second colored-state (e.g., a white-state). The SPECink is considered semi-permanent because, once the SPEC particles have switched, e.g., from the colored-2 state to the colored-1 state (or vice versa), the SPEC particles remain in that state until a stimulus (e.g., electrical) causes the SPEC particles to switch to the other state (e.g., from the colored-1 state to the colored-2 state). The SPEC particles 1100 may be laminated between layers of film to form the top of the label 1000. The composite layers contained within label 1000 may allow for scanning modes of operation based on reflective, transmissive, or emitted wavelengths of energy (e.g. reflected light, transmitted filtered light, emissivity of IR thermal energy wavelengths, black-light, electroluminescence, UV, etc.)

In an embodiment, the triggering event is dependent on a predetermined period of time, e.g., the time that the food in the container remains edible. A user may place the label 1000 on the container having the food therein. Pressure sensors disposed within the label 1000 may allow the user to interact with the user interface 1020 to toggle between numbers of days that the particular food may remain in the container (e.g., 2 days, 3 days, 4 days, 5 days, 10 days, 30 days, etc.). Once the user has selected the predetermined number of days that the food may remain in the container, the portion 1015a may turn green, and the container may be placed in the refrigerator or cupboard, as the case may be. A timer 1130 (FIG. 11) disposed within the label 1000 may keep track of the elapsed number of days, and upon reaching the half-life (e.g., 5 days for a label set for 10 days), the portion 1015a may switch from the green-state to a white state (or a second colored state), and the portion 1015b may switch from a white-state (or a second colored state) to a yellow-state. This readily alerts the user that the food in the container is nearing the end of its edible life. The timer 1130 continues to monitor the elapsed number of days, and upon reaching the predetermined number of days, the portion 1015b may switch from the yellow state to the white state, and the portion 1015c may switch from the white state (or a second colored state) to a red-state. The user may then readily see that the food in the container is deemed no-longer safe to eat, and the food may be disposed accordingly. The label 1000 may be reusable by simply toggling through the options to reach a "0" day, which may reset the label 1000 for later use.

Optionally, the label 1000 may include a communications module 1125. The communications module 1125 may be configured to communicate (e.g., via RFID, Bluetooth, near-field communication, or other data exchange function now known or later developed) with the user's phone, or with the refrigerator (e.g., where the refrigerator is configured with a display). For example, at the half-life of the food in the container, the portions 1015a and 1015b may change as described above, and an alert may additionally be sent to the user's phone to alert the user that the food item is nearing expiration.

In some embodiments, the label 1000 may include one or more sensors 1135 configured to determine the identity of the food in the container (or an attribute about the food in the container). Upon determining the food in the container, the sensors 1135 may transmit the information (e.g., via the communications module) to a processor 1140, which may access a database 1145 having information regarding spoilage information for a variety of food items. Upon locating the correct food item, the processor may cause the user interface 1020 to display information about the food item (e.g., the number of recommended days for that food item to be stored before spoilage), and the timer 1130 may be automatically set accordingly. In embodiments, the user may be required to confirm the display information by, for example, touching the label 1000 (e.g., one tap indications confirmation, two taps causes the display to begin to toggle through the number of days).

Additional, or alternate, sensors may be incorporated into the label 1000. For example, temperature sensors, bacteria sensors, humidity sensors, motion detectors, IR sensors, or any other sensor relevant to the environment of the label, whether now known or later developed, may be included as part of the label. The sensors may be configured to determine various attributes about the environment of the label. For example, in embodiments where the label is incorporated into food containers, a bacteria sensor may tell if harmful bacteria is present, or likely to be present (e.g., due to humidity conditions as measured by a humidity sensor). In other embodiments, such as where the label 1000 is placed, for example, on a wall in a bathroom, a bacteria sensor incorporated into the label may detect the presence of bacteria in the restroom. In embodiments, the connection with the communications module 1125 as described above may permit the label 1000 to be configured to provide a dynamic controlled response to eliminate or reduce the bacteria. In such embodiments, an output device, such as a UV-A, UV-B, and/or UV-C light (or other appropriate output device for a particular sensor), which may be configured as part of the label 1000, or a separate device in communication with the label 1000, may be activated. Activation of the UV-A, UV-B, and/or UV-C light (or other output device) may thus be triggered based on information received from a sensor. The UV-A, UV-B, and/or UV-C light (or other output device) may remain activated for a predetermined period of time (and thus may also be in communication with the timer). Additionally, or alternately, the UV-A, UV-B, and/or UV-C (or other output device) may be automatically activated after a particular time-lapse and may therefore not be reliant on information from a sensor. For example, in an embodiment where the label is placed in the UV-A, UV-B, and/or UV-C light may be activated at the half-life of a food item to ensure that the food remains healthy for a user to consume. In another embodiment, where the label is placed, for example, on a wall in the bathroom, the UV-A, UV-B, and/or UV-C light, in connection with the timer, may be programmed to activate for, e.g., 5 minutes every hour, 30 minutes between 12:00 a.m. and 1:00 a.m., etc. To prevent harmful ultraviolet rays from reaching humans, a motion detector in communication with the label 1000 may confirm that there are no humans in the room before the UV-A, UV-B, and/or UV-C lights are activated.

Figure 11:
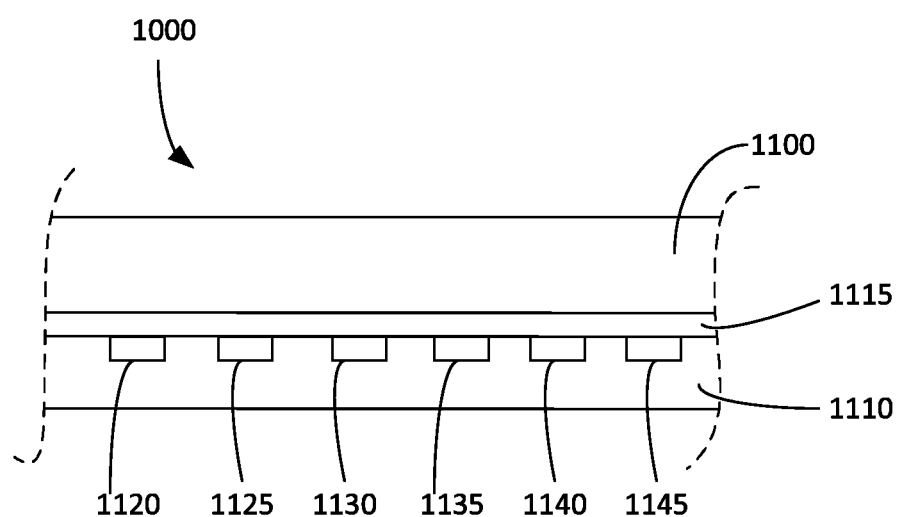
FIG. 11 shows a side view of the label of FIG. 10.

Because the power required to cause the particles to switch states is low, a lithium battery 1120 (or other type of battery such as an ultra-capacitor, supercapacitor, or batteries having energy-harvesting capabilities, for example) may be sufficient to cause the electrical stimulus needed to activate the particles. The battery 1120, communication module 1125, timer 1130, other sensors 1135, processor 1140, and database 1145 may be (but need not be) embedded in a flexible circuit board 1110 which may be disposed at a backside of the label 1000, as shown in FIG. 11. In embodiments, the one or more sensors may be configured as an adhesive layer 1115. Here, the adhesive may be configured to act as a pressure sensor to allow the user to set the timer as described herein. In an embodiment, the adhesive 1115 may further act as a heater or defroster. The heater or defroster may be configured to defrost a portion of the container to allow the user to see inside of the container. Exemplary adhesives are described in U.S. patent application Ser. Nos. 15/365,923 and 15/678,392, for example.

While the label 1000 is described as being adhered to a container for storing food, it shall be understood that the label 1000 may be configured for other purposes, including placement on freight packaging, shelf displays, etc. The label 1000 may, but need not include computer-readable information as described herein. As will be understood by those of skill in the art, the user interface (via the processor) may be configured to provide information relevant to the environment in which the label 1000 is deployed, and is not limited by the description provided herein.

It shall be further understood that the SPEC particles may be incorporated for use in many additional applications. It shall be clear from the above discussion that the SPEC particles have color changing attributes. The particles may be programmable, reprogrammable, transmissive, reflective, visible within the human visible range, and/or emissive within the infrared and/or ultraviolet spectrums. In embodiments, the particles may be virtually invisible to human viewers in one mode (e.g., an "off" mode) and in another mode (e.g., an "activated" mode) the particles may become visible. In further embodiment, the particles may be incorporated into liquid crystal displays (LCD), light emitting diode (LED) displays, electroluminescent (EL) displays, and/or organic light emitting diode (OLED) displays.

Among other reasons, the SPEC particles having color changing attributes may make the particles particularly useful in human-engaging applications where real-time information and/or safety is key. The SPEC particles may be deposited on virtually any surface. In embodiments, the SPEC particles may be laminated between layers of transparent substrate or film. The resultant substrate having the SPEC particles may be incorporated as, for example, a book cover, a page in a book, or may be inserted into a pocket formed into a folder or book. The SPEC particles may be uniformly deposited, deposited in a pattern, etc. In one embodiment, a plurality of SPEC particles having identical color-changing attributes may be deposited onto or within the substrate (e.g., all particles are a first color in a first mode (a "resting" mode) and a second color in a second mode (an "activated" mode)). In another embodiment, a plurality of a first type of SPEC particles having a first color changing attribute, and a plurality of a second type of SPEC particles having a second color changing attribute, may be deposited onto or within the substrate. The first and second types of particles may be deposited in a particular pattern. Additional types of SPEC particles may optionally be included. As described herein, power to the particles may be provided via a flexible circuit board which may be provided behind the particles, or embedded between layers of particles. The flexible circuit board may have a variety of components (e.g., batteries, memory, processors, communication modules, etc.) as is known in the art. The communication modules may allow the particles to react in response to a remote signal. Consider for example, an embodiment where a plurality of particles is deposited on a substrate that is incorporated into a folder or binder for students in a school. A first portion of the particles may be selectively activated by the student to display the student's favorite color. The substrate (e.g., via the communications module) may be in communication with an alert system at the school. In an emergency situation, the alert system may be activated, and the communications modules of each of the substrates may receive an alert. The alert may cause the first portion of the particles to selectively transition to the "resting" mode (e.g., a color-2 mode, or a white mode). A second portion of the particles (e.g., being selectively red in an activated state) may then be activated to alert the students to the emergency situation. In embodiments, the particles, in communication with the alert system, may be programmed to provide an instruction message to the students (e.g., "Take cover in closet", "Remain in place", etc.). Optionally, the second portion of the particles may "flash" between the activated state and the resting state to provide the student with a visual, eye catching alert. Thus, emergency situations may be easily, quickly, and quietly communicated to students throughout a school.

Of course, the substrate may be incorporated into various devices within a home, workplace, public destination, outdoor environment, etc. Several further examples are provided below, which are intended to be exemplary in nature only and not intended to be limiting.

In one embodiment, the SPEC particles are incorporated into a paint, SPECink, or adhesive that may be used to provide color changing attributes to, for example, beverage or food containers. For example, consider a traditional Diet-Coke® can. The red ink on the can may be replaced by SPECink comprising the SPEC particles. In a "rest" state, the particles may appear as a red ink, similar to what is shown on a traditional can. Upon activation, however, the particles may "flash" between a colored-1 state (e.g., red) and a colored-2 state (e.g., white, or another color). Such flashing may cause attention to be drawn towards the can, providing increased branding recognition. In embodiments, sensors may optionally be distributed at or near the can (or within the ink itself) to measure, for example, the amount of liquid in the can. When the can is full, the particles may show the ink in a "rest" state. As the contents in the can are depleted, the particles may begin to flash, for example, slowly at first, and more quickly as the can approaches emptiness. Thus, in a retail environment, it may be possible for a waiter to quickly and easily tell whether a customer is in need of another drink (e.g., similar to the fuzzy field graphically encoded icons described above) while the user sees an aesthetically pleasing and intriguing can exterior.

Similarly, the particles may be distributed, for example, on the outside surface of a flower pot (e.g., as a paint). Moisture sensors may also be distributed at or near the flower pot. As the water evaporates leaving the plant dry (as measured by the sensors), the particles may begin to flash between a colored-1 state and a colored-2 state. In embodiments, the sensors may be distributed along a vertical line in or on the pot. As the water evaporates, the sensors may cause the particles to switch from a colored-1 state to a colored-2 state. The sensors may be pre-programmed to cause the particles to switch at a predetermined moisture content (e.g., at or below 10% moisture) Therefore, a viewer may be able to readily tell the moisture content of the soil in the pot, and may thus provide water. In certain embodiments, a plurality of particles having different colored-1 and colored-2 states may be deposited on the pot (e.g., different shades of green). When the moisture content is at 100%, a first particle may be activated to show the pot as, for example, Kelly green. As the moisture content decreases, the first type of particles may be deactivated (e.g., flip to a colored-2 state, such as white or black) and a second-type of particle may be activated, thereby changing the apparent color of the pot.

In another embodiment, the SPEC particles may be utilized as a paint, SPECink, distributed within a film, or laminated within a substrate for use on displays such as road signs or traffic cones. Of course, other displays (e.g., store displays) may additionally utilize such particles to draw attention to a particular product, sale, etc. Here, portions of a display, such as a road sign, may have particles distributed in a pattern known to drivers. For example, consider object markers used on the road today (road signs having a yellow background with black diagonal stripes). Here, particles may be programmed such that in a first state, the particles distributed in the traditionally yellow section are viewable to the user as "yellow" and the particles distributed in the traditionally black section are viewable to the user as "black." When the particles are activated (e.g., via a temporal sensors, light sensors, etc.), the particles in the traditionally yellow section may flash to black, and the particles in the traditionally yellow section may flash to yellow. The flashing may occur in succession for a predetermined period of time. Similarly, a stop sign may be configured to flash between white and red. In embodiments, it may be particularly useful if the particles have a reflective attributes. Thus, attention is drawn to traffic signals such that drivers may be made increasingly aware of the hazard or instruction.

In still another embodiment, the particles may be utilized as a paint, ink, distributed within a film, or laminated within a substrate for use with tiles (e.g., floor tiles, tiles for a counter top, etc.). This may be particularly useful in retail environments (e.g., grocery stores) where hazards may occur that are not readily identifiable by shoppers. For example, a substrate having the particles dispersed therein may be a layer of a tile. The tile may include one or more of a variety of sensors (e.g., moisture, bacteria, temperature, etc.). In an embodiment, the tile is configured for use on a floor. Moisture sensors disposed on or within the substrate may detect when a spill is affecting a particular tile. If the sensor detects that there is moisture on the tile, the particles in the substrate may change from a colored-1 state to a colored-2 state to alert customers that the tile is not safe and that an alternate route should be taken. In another embodiment, the tile is configured for use on a countertop. Here, bacteria sensors disposed on or within the substrate may detect the presence of harmful bacteria. If the sensor detects that there is harmful bacteria, the particles in the substrate may change from a colored-1 state to a colored-2 state to alert the user that the tile is not safe and that the tile should be thoroughly cleaned. Optionally, when the bacteria sensor identifies the presence of harmful bacteria, a bacteria-killing light (e.g., UV-A, UV-B, and/or UV-C, which may be a part of the substrate or remotely positioned such that the light contacts the substrate, for example, under the upper cabinets) may be activated to remedy the situation.

The floor tiles may include sections of sidewalks at intersections (e.g., the corner sections). The particles may be distributed to provide information to a user such as to flash red if it is not safe to cross the road, or to provide direction indicators (e.g., arrows). In some embodiments, the sidewalks may include additional programmable smart material particles, such as particles configured to heat up (e.g., so as to melt snow at busy cross-sections).

It shall thus be understood that the particles may be utilized in a variety of different applications, and further non-limiting applications include use with fishing lures, as an additive to nail polish, on shoes, purses, sunglasses, sportswear, military gear, and other fashion forward items, in building materials such as wall-paint, on baseboards, on doors, shingles, etc. The particles may additionally be utilized to program machine readable indicia on the graphically encoded icons described herein.

Figure 12:
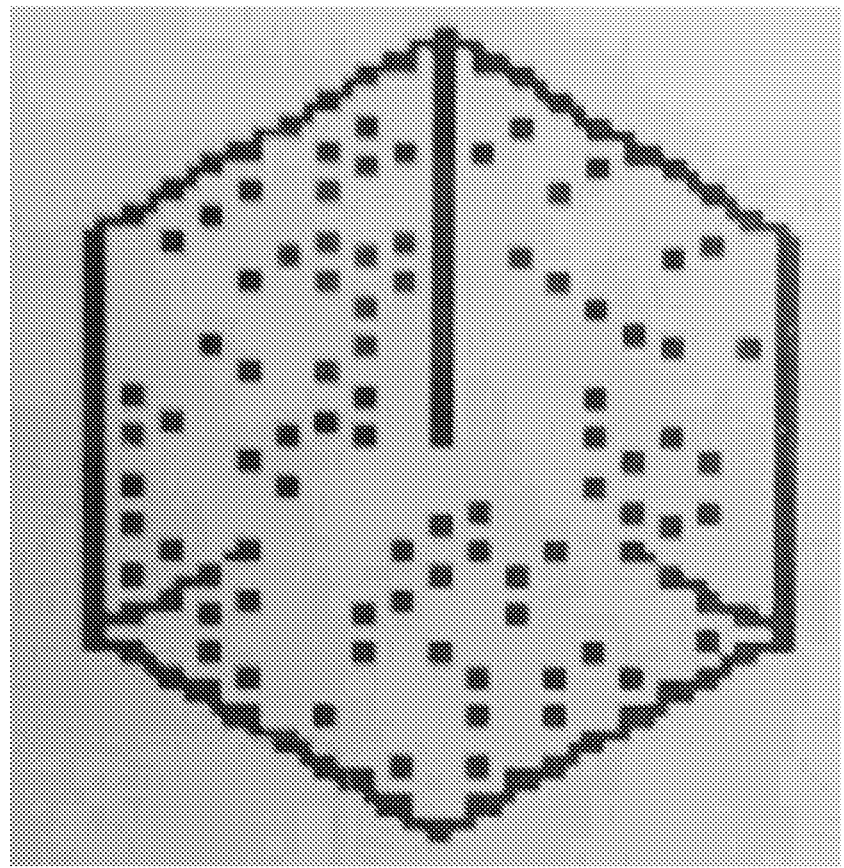
FIG. 12 shows a graphically encoded icon according to another embodiment of the invention.
Figure 13:
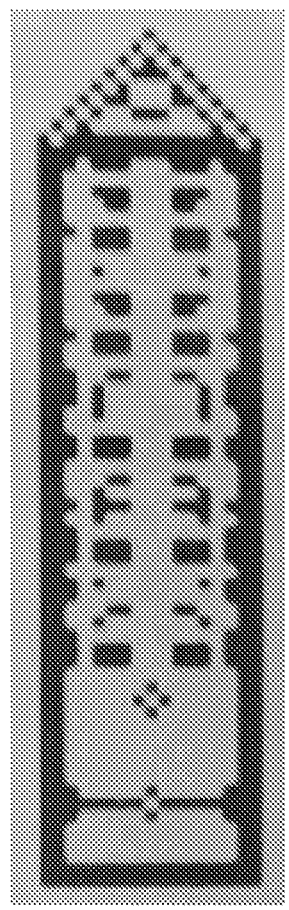
FIG. 13 shows yet another graphically encoded icon according to an embodiment of the invention.

For example, consider again FIGS. 3A, 4A, 4B, 5, 6A-C, 7, as well as FIGS. 12 and 13. FIGS. 12 and 13 represent exemplary configurations of graphically encoded icons 600 having a non-rectangular shape. Within the graphically encoded icons 600 are machine readable sections 610 having areas of programmability. Here, the dark-colored dots are arranged in a pattern so as to provide information about an object to which the graphically encoded icon 600 is attached. The dots may be areas of SPEC particles that are "activated" (i.e., turned to a color state), and the white areas likewise correspond to areas of SPEC particles that are "deactivated" (i.e., turned to a white state). The black dots can be "deactivated" and one or more portions of the white area can be "activated" from time to time in order to convey updated information about the object. For example, on a shipping pallet the information may be updated to provide each location where the pallet was loaded or unloaded onto a carrier, the length of time spent at each location, the parties involved in the transaction, etc. Accordingly, the graphically encoded icons can dynamically provide information to a user.

Thus it is clear that graphically encoded icons can be encoded in several modes, including passive, proactive, and dynamic. The graphically encoded icons allow for readings of attributes about an object (e.g., container, surface, or system) which can be presented as geometrically predictable and decodable icons, images, or patterns in order to express qualitative and/or quantitative data. The SPEC particles may be configured to form lattice or lattice-work structures that can be formed into the geometric shapes forming the graphically encoded icons. In embodiments, the lattice-work can be programmed to form a structural array of elements (or node particles) that can be formed in one-, two-, or three-dimensional groupings.

Figure 14:
FIG. 14 shows a picture of an embodiment of a graphically encoded icon disposed on a salt shaker according to an embodiment of the invention.

While prior art systems provide means by which information can be presented to, and encoded by, humans and machine, such information is limited to numerical strings. However, in certain applications, it may be important for the information to convey not a number, but an actual attribute of the product or item that one is attempting to encode for scanning purposes by an observer. For example, and similar to the dressing container described above, a salt shaker (FIG. 14) on the table may contain a label that has a vertical gradient pattern that resembles industry standard bar code patterns. There may be a desire to scan intrinsic attributes related to the contents of the salt shaker container. The fields of information (e.g., the area in which the black dots occur) may be structured and encoded in such a manner that the level and contents of the salt shaker can be qualitatively examined by a scanning and decoding system without digitally acquiring the content level of the container. In this example, the white salt may contrast against a darker printing of a graphically encoded icon "frame" that is strategically placed onto the container. The mixed-mode of quantified data fields, along with qualified fuzzy fields (or analog data—the area in which one can see through the container and into the contents of the container) may be advantageous when the goal is to read naturally occurring physical attributes. The patterns and placement of the graphically encoded icon frame may increase the probability of decoding a reliable reading of the fuzzy fields.

In embodiments, a scanning voting system such as a simple 3-of-5 reading and scoring system may be employed to improve reliability of the scanned data. If the fuzzy fields yield varying results over time via multiple scans, in embodiments, a computing system may average and/or accept the more prevalent result of the fields that are scanned. These techniques may assist in reliability for qualitative fuzzy fields and increase reliability of scanned quantitative fields. A quantitative field may be one that is fixed (e.g., is in one of two states). In embodiments, reliability may be enhanced by a mathematical cross-checking system such as checksums, CRC, etc.

Qualitative fields may be enhanced in reliability by comparing sets of analog data in adjoining contiguous fuzzy fields such as a gray-scale reading of the salt shaker in a vertical range of the graphically encoded icon overall frame. The relative readings of analog grayscale (and/or, in embodiments, colors in RGB) may assist in finding the specific granularity of reading the content layer of salt. This may allow anomalies such as dirt or other data-noise to prevent false readings. In embodiments, it may be desirable to exclude the fuzzy fields from the mathematical calculations that are used to validate the quantitative fields.

Multiple versions of the encoded data set may be made available to the observer during scanning and decoding. One version of information (e.g., passive) may be a strictly digital and quantitative perspective that excludes the fuzzy bits entirely. Another version (e.g., proactive) may include all bits and fields but the fuzzy bits are triggered by a 50% (or other level) decision of logic for their data result for each fuzzy field. A more advanced mode (e.g., dynamic) may incorporate one or more of the techniques above such as multiple scan, voting, and CRC error detection and correction. In an embodiment, the computing system in a RAW mode stores an image of the overall icon for further processing; this data may be sent to the cloud for processing and system level analysis.

A passive mode graphically encoded icon may be as simple as a line that has markings at measurable points along a line. The quantified data represented by the graphically encoded may be a wider marking at a certain location along the line as compared to the other unit markings along the line. FIGS. 15 and 16 below provide examples of a one dimensional and a two dimensional graphically encoded icon, respectively. In FIG. 15, the graphically encoded icon can be read as number 8. In FIG. 16, the graphically encoded icon can be read as a series of numbers 3, 5, 8, 11.

In embodiments, multiple dimensions may exist with different colors or varied printing techniques that reflect based on excitation wavelengths of light or energy waveforms (such as radio frequencies (RF)). Focal lengths may be used to increase the perceivable and recognizable dimensions of graphically encoded icon recognition.

Quantitative data encoding may yield specific information in the form of numerical values that can be mathematically validated. This may be in the form of checksums, CRC algorithms, or other techniques such as redundant bit stuffing relying on statistical probability to yield a resulting probable error percentage in GEI data decoding. These techniques are generally used for error detection or data field validation. However, one of the major benefits beyond Error Detection when encoding quantitative (or digital) data may be the potential ability to provide Error Correction to fields of data (rows, columns, shapes, lines, dashes, etc.) where a questionable reading has occurred.

In embodiments, qualitative or fuzzy logic data may be encoded intentionally or naturally based on material properties. An example of qualitative data (or fuzzy bits) may be an observer examining the scratched part of the CD and reporting the "best guess" of whether the scratched portion should be replaced by a one or a zero. Another example would be a sequence of encoded numbers for 1, 2, 3, 4, and 5, but the observer reads 1, 2, 3, ?, 5. If the observer takes several readings and the questionable data field is close to "4" then four is likely the correct answer. This would be a case of a qualitative review for consideration as a resolution to the fuzzy field of data.

As described above, smart materials such as SPECink, may be utilized to exist on or within a substance (or structure) in such a way that can create a grid or pattern of graphically encoded icon fields. Each area of SPECink may be switchable to be dark or light based on a desired state of information for a graphically encoded icon field. In an embodiment, a graphically encoded icon field or group of fields may change color based on vibration, exposure to bacteria, moisture, aging, etc. These fields may generally be envisioned as fuzzy fields. However, in some cases the natural function and reliability of programmable matter may be deterministic and viewed as pseudo-digital (i.e., it can be reliably read as "on" or "off" with minimal unknown status). In these cases, the encoding system may treat such fields as qualitative but highly reliable. Or, in advanced systems, the error detection and correction calculations may have an active mode that changes a checksum field state based on intrinsic field fuzzy readings or trigger levels. In embodiments, integration and time stabilizing techniques may be used to normalize the fuzzy field trigger decisions.

One of the limitations of data acquisition and collection is the limited number of access points throughout the universe and on planet Earth today. Current methods strive to apply blanket coverage of ubiquitous access points of data collection opportunity to allow an overlapping mesh grid for SCADA and IoT communication globally. However, it is important to note that graphically encoded icons (or encoded patterns) can be utilized in nearly any environment to provide information to a user. In embodiments, roadways may have surface patterns that include or resemble a QR code that contains some fixed quantitative graphically encoded icon fields, while other fields may comprise programmable particles within the asphalt or concrete itself.

One goal of graphically encoded icon usage in the mass deployment and intrinsic mode is to allow many mobile collection nodes (e.g., cameras, phones, cars safety systems, roadway traffic scanners, energy management systems, self-driving highway systems, etc.) to scan at will through opportunistic free-will. This concept may be encoded beyond just the structure of the graphically encoded icon field shapes and purposes. In an embodiment, one goal is to setup fields on the graphically encoded icon patterns in such a way as to attract an observer to scan many graphically encoded icon images into a device that is at a known physical location, at a known time, from a known entity (e.g., machine, person, system, etc.). The scan may encode an end-node identifier for itself and a routing target destination (i.e. www.ioTwebpaae.com) but append with supplemental fields of information such as sensor readings, trending data alerts, and requests to the higher-level system.

Data resulting from the user's scan may include post critical and intrinsically available data along with location, time, and locally important data/alerts. The user may then receive a resulting webpage including information about the area he is visiting or a coupon for the closest restaurant. The combination of multi-purpose media and network usage along with redundant network scanning reinforcement may provide hundreds of readings each day to the same end-nodes for data collection purposes. Additionally, there may be a back-channel such as localized Bluetooth or WiFi that provides a limited link for data to be returned to the end-node while the user is nearby in the scanning session. This may all occur in real-time as a user's car drives by a specific mile marker on the highway.

Mass scanning of end-nodes from multiple opportunistic network taps may enhance security and provide a more stable access path to millions of end nodes. Furthermore, the fuzzy intrinsic fields may be resolved more reliably with multiple devices and network access methods being utilized in real-time. The concept of "data analytics in the cloud" may be realized more easily with such a mass collection system as opposed to a massive web-mesh system. All of these techniques may be used interchangeably.

Security may be enhanced by providing fragments of data that have limited perspective and may be encrypted in a rolling system over time and contain different encryption keys, methods, and data stuffing techniques per end-node. By positioning hundreds of data fragments on varying networks and having obscure purpose for each node, the data itself can become very benign. Furthermore, the output for the user can evolve to be socially appealing and the data backchannels may become essentially seamless, and extremely low-cost to operate.

In embodiments, groupings and distribution of multiple graphically encoded icon patterns as an array or composite set may be useful to create patterns that are duplicating and replicated based on the scale (or zoom level) of the observer. Techniques such as fractal encoding may be used to create repeating patterns over scale zoom levels that can help with broad phase alignment, authentication, and decoding synchronization.

Figure 17:
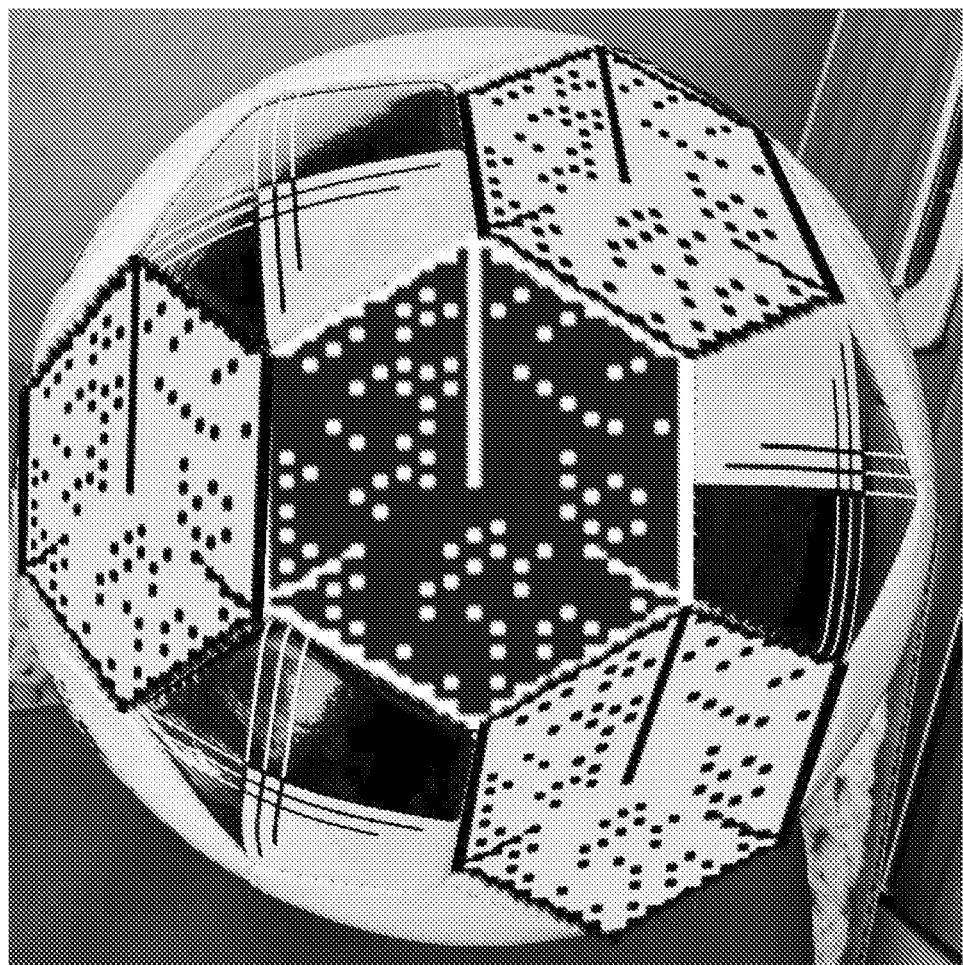
FIG. 17 shows a plurality of graphically encoded icons disposed on a three-dimensional object according to a further embodiment of the invention.

Patterns of graphically encoded icons may be planar or 3D geometrically shaped such as a sphere or buckyball polygon with three-dimensional distribution of fields (e.g., FIG. 17). Distribution of planar fields on a three-dimensional multi-planar surface such as a sphere (or geodesic dome) may create a concave or convex distribution of planar fields. The embedded and encoded geometric patterns may be used to enhance the planar integrity of the graphically encoded icon, or graphically encoded icons within the three-dimensional space. Mathematical techniques may be used to adjust and correct the perspective of planar distortion and implied or inferred geometric patterning. Individual data fields may also contain geometric patterns or shapes within one-dimensional, two-dimensional, or three-dimensional perspective, and may not need to be a specific dot in space. Thus, a data field may actually be a subset of a fractal encoded environment.

Data field elements within the graphically encoded icon may be passive such as reflective or transmissive of a particular color or pattern. Each data field may also contain a geometric shape or pattern of motion or attribute that changes over time. An example of this could be a specific data field that is a resonant molecule or cluster of molecules that is vibrating or rotating at a specific vibration or resonant frequency pattern (including harmonics).

Graphically encoded icons can be utilized with systems within the macro-, micro-, and/or nano-scale. An example of a nanoscale implementation may include an outer definition of the graphically encoded icon geometry made up of carbon nanotubes that could contain a distribution or lattice of C-60 (i.e., Buckyballs) that could encode a specific pattern of data wherein the Buckyballs create the individual data fields and a three-dimensional perspective may be represented through the resonance or vibration of regionally positioned carbon molecules.

A macroscale implementation may have galactic applications. Imagine a distribution within a galaxy of pulsars where the pulsars are the encoded data field positions within the graphically encoded icon pattern. Each pulsar may be transmitting a series of information beacons by varying their magnetic rotation or position including color or radiation pattern. The combination of static fields such as star positions of particular color temperature may be used to identify orientation and position of the graphically encoded icon while the individual data fields may be encoded as a composite of the information intended to be decoded by the viewer. A simple example would be multiple pulsars that are transmitting different bits of information such as the one's place is transmitted by Pulsar A, the two's place is transmitted by Pulsar B, and the four's place is transmitted by pulsar C. The synchronicity of the informational asynchronous composite of graphically encoded icon(s) may provide complex information transmission that can be sampled over time by the viewer.

A more micro perspective could be a segment of magnetic tape that contains a two-dimensional grid of magnetic particles such as ferric oxide that contain a gradient of electromagnetic poles similar to a magnetic strip or magnetic audio tape. But in a graphical application, there may be a fixed position of two-dimensional geometric patterns that can be scanned without requiring a sequential swiping of the tape itself. Each magnetic particle can become a graphically encoded icon data field, while the composite of the magnetic pattern can make up the graphically encoded icon geometric definition or shape.

It is thus evident that graphically encoded icons can be utilized in many different scenarios and for many different purposes in order to send and receive information securely and in a way that the information can be readily identified and updated as necessary. Graphically encoded icons may be utilized in one-dimensional, two-dimensional, or even three-dimensional form. Different embodiments of graphically encoded icons, such as icons 310, 410, 510, 500, and/or 1010 can be developed and utilized depending on the situation, and it should be understood that multiple versions of graphically encoded icons may be utilized in any given situation.

Figure 19A:
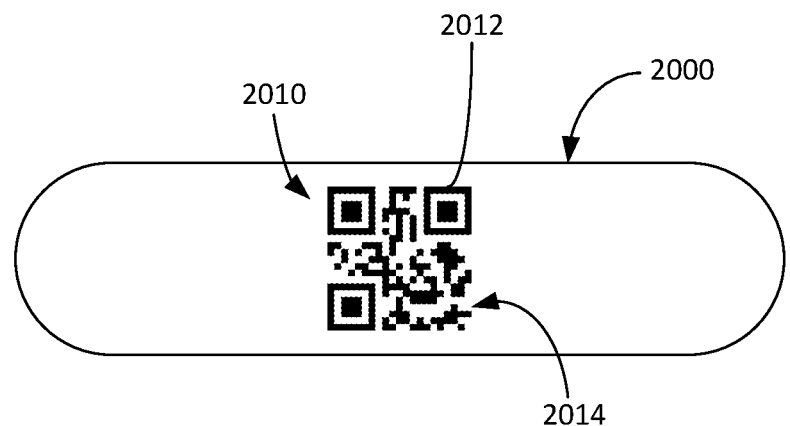
FIGS. 19A-B show an exemplary embodiment of a graphically encoded icon according to various aspects of the invention included as part of a bandage.
Figure 19B:
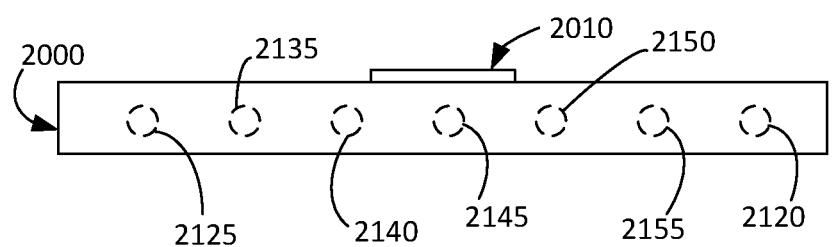

For example, FIGS. 19A-B illustrate a bandage 2000 having a graphically encoded icon 2010. The graphically encoded icon 2010 may be substantially similar to graphically encoded icon 310, 410, 510, and/or 1010, for example. The graphically encoded icon 2010 may include at least one static portion 2012 and at least one intrinsic portion 2014. The intrinsic portion 2014 may be configured to provide information about a person wearing the bandage, and in some embodiments, may be reconfigurable as described herein. For example, one or more areas of the intrinsic portion 2014 may change states based on a trigger. For example, in embodiments, indicia in the intrinsic attribute portion 314 may initially appear invisible to the naked eye and to the scanner (e.g., a computing system having an imager), and may thereafter change states based on a trigger (e.g., an input, such as from a doctor) to convey meaningful information about an attribute associated with the person with which the graphically encoded icon 2010 is associated.

As with embodiment 300, the intrinsic attribute portion 2014 may include stimuli-responsive polymers and/or other such materials that exhibit a change in a characteristic thereof in response to a known stimulus. For example, and as discussed above regarding embodiment 1000, the bandage 2000, may include a communications module 2125. The communications module 2125 may be configured to communicate (e.g., via RFID, Bluetooth, near-field communication, or other data exchange function now known or later developed) with a computing device, such as a physician's computer or a user's phone. For example, the physician may complete imaging scans on a person wearing the bandage, and the intrinsic portion 2014 may be updated to include information about the most recent scan. When the graphically encoded icon 2010 is thereafter read (e.g., via an imaging device at a later doctor visit), the information about the patient can be readily scanned and ascertained by the doctor without having to pull the patient's files, thus saving time and effort. In embodiments, the response of the stimuli-responsive polymers in the intrinsic attribute portion 2014, once triggered by the triggering stimulus, may be permanent, semi-permanent, and/or reversible.

In some embodiments, the GEI 2012 may include one or more sensors 2135 configured to determine an attribute about an area underlying the bandage 2000. Upon determining the attribute (e.g., presence of bacteria), the sensors 2135 may transmit the information (e.g., via the communications module) to a processor 2140. The processor 2140 may store the information in a database 2145. In some embodiments, the bandage 2000 may include a networking device 2150 configured to communicate over a network with a third party, such as a treating physician. Thus, information may be easily transmitted between the person wearing the bandage 2000 and the physician without having to rely on the person to relay information to the physician themselves.

Additional, or alternate, sensors may be incorporated into the bandage 2000. For example, temperature sensors, bacteria sensors, humidity sensors, motion detectors, IR sensors, imaging sensors, or any other sensor relevant to the environment of the bandage 2000, whether now known or later developed, may be included. The sensors may be configured to determine various attributes about the environment of the bandage 2000.

In embodiments, the connection with the communications module 2125 as described above may permit the bandage 2000 to be configured to provide a dynamic controlled response to eliminate or reduce a scenario, either automatically or in conjunction with a treating physician. For example, where it is determined that certain harmful bacteria is present, an output device 2155, such as a UV light (or other appropriate output device for a particular sensor), which may be configured as part of the bandage 2000, or a separate device in communication with the bandage 2000, may be activated. Activation of the output device 2155 may thus be triggered based on information received from a sensor 2135. However, in some embodiments, the physician may be required to communicate with the bandage 2000 (e.g., remotely over a network via the networking device 2150) to activate the output device 2155.

A battery 2120 (or other type of battery such as an ultra-capacitor, supercapacitor, or batteries having energy-harvesting capabilities, for example) may be sufficient to cause the electrical stimulus needed to activate the bandage 2000, and particularly the particles of the intrinsic portion 2014, the sensors 2135, the output device 2155, and/or any other component of the bandage 2000. The battery 2120, communication module 2125, other sensors 2135, processor 2140, and database 2145 may be (but need not be) embedded in a flexible circuit board.

Figure 20:
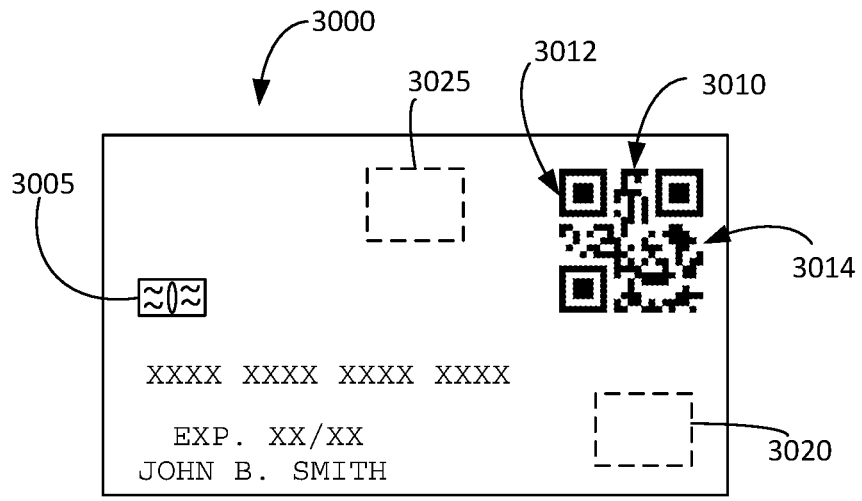
FIG. 20 illustrates a further embodiment of a graphically encoded icon according to various aspects of the invention included as part of a credit card.
Figure 21:
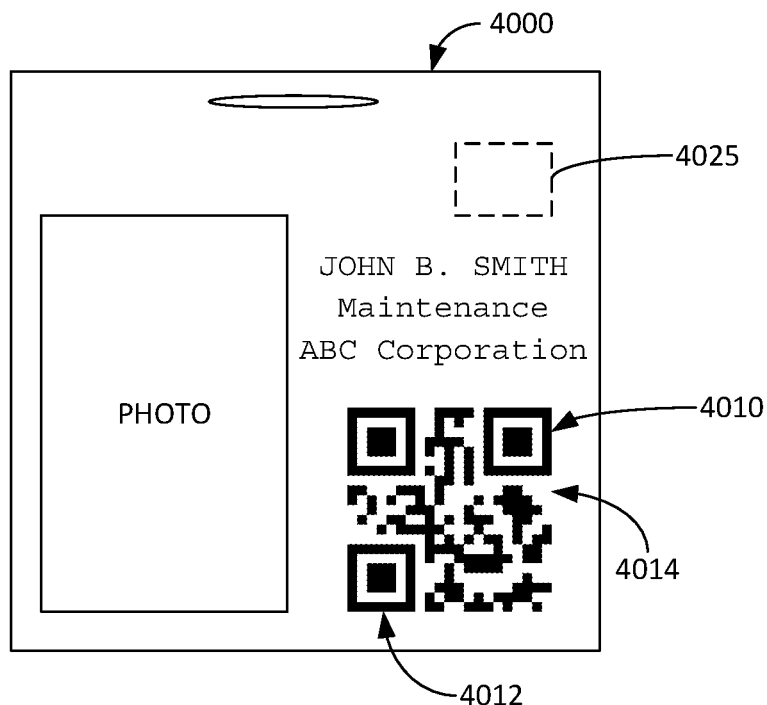
FIG. 21 illustrates still yet another embodiment of a graphically encoded icon according to various aspects of the invention included as part of a security badge.

FIGS. 20 and 21 illustrate still further embodiments of accessories incorporating graphically encoded icons (e.g., such as graphically encoded icons 310, 410, 510, 1010, etc.) to increase security by utilizing cryptography, namely, GEIs, to encrypt data that is both dynamic and verifiable. In FIG. 20, a credit card 3000 includes a chip 3005 typical with modern-day credit cards, and a graphically encoded icon 3010, which may be substantially similar to graphically encoded icon 310, 410, 510, and/or 1010, as described herein. The graphically encoded icon 3010 may thus include a static portion 3012, and an intrinsic portion 3014 that includes at least one area that may change states based on a trigger. The trigger may be, for example, the interaction of the credit card with the credit card reader. In other words, when the credit card is used to complete a transaction, the intrinsic portion 3014 may be updated. Thus, the intrinsic portion 3014 may include a permanent, semi-permanent, or reversible record of the transactions associated with the card. In some embodiments, the intrinsic portion 3014 includes an embedded key validator that allows the user and/or the system (e.g., the GEI reader) to validate the current transaction and/or future transactions. In some embodiments, a embedded key validator may be a validation area 3020, which may be incorporated directly into the GEI 3010, or may be separate therefrom. The validation area 3020 may provide a visual indicator, which may be human readable and/or machine readable, that a transaction is verified as being authentic, skeptical, and/or fraudulent. In embodiments, the validation area 3020 may include SPEC particles that are programmable to turn color, provide an image, or otherwise indicate the current status of the card. The validation area 3020 may be triggered via the card reader during a transaction. For example, if the card 3000 is used to purchase an item in a location that is atypical for the card user, then the validation area 3020 may be triggered to provide a "skeptical" indication. The intrinsic area 3014 may be updated to record the transaction, and may further be updated to include a record that the card was flagged as having potential unauthorized activity as a result of the transaction.

In some embodiments, the "skeptical" indication will be dynamic such that an unauthorized user will not be aware that the card is flagged. When the user attempts to use the card 3000 at another location or for another transaction, the store employee may be prompted (e.g., via the computer system) to look for a particular "skeptical" indication and to further verify if the user is authorized for the transaction.

This may require the user to call his or her credit card company to verify that he or she is travelling and that the charges are authorized. In some embodiments, when the card is flagged, the user may be prevented from further using the card. In some embodiments, a GEI reader at a store may be able to read the GEI 3010 and alert the employee as to an issue with the card, with or without the verification area 3020. In some embodiments, the card 3000 may be equipped with an RFID tag 3025, such as any RFID tag now known or later developed. The RFID tag 3025 may include information about the card 3000 and/or the user of the card 3000, and may be used to track the location of the card 3000, information about the card 3000, and/or information about the user of the card 3000, as is known to those of skill in the art. In embodiments, the RFID tag 3025 provides still another level of security capability to the credit card 3000. Here, in some scenarios, an RFID signal may be received and processed by the RFID tag 3025, and the tag 3025 may provide a signal in response, verifying the information on the tag 3025. However, in some instances, the signal from the RFID tag 3025 may be weak or the RFID reader may be unavailable. Here, the GEI 3010 may provide the necessary information to verify the authenticity of a transaction. A GEI reader, such as a camera or any other reader capable of reading and processing the GEI 3010, may scan the card 3000 for the GEI 3010, and upon determining the presence thereof, ascertain the information about the card 3000 and/or the user necessary to validate the transaction. Thus, even when the RFID tag 3025 does not work, it is still possible to provide extra validation security to the credit card transaction. In still other embodiments, the RFID tag 3025 and the GEI 3010 work together in a RFID-GEI hybridized system to provide uni-directional and/or bi-directional communication to and from the card 3000 and a computing system to validate transactions.

It should be understood that while the GEI, the validation area 3020, and the RFID tag 3025 are shown as being incorporated with a credit card 3000, such components can be also, or alternately, be incorporated into any article where it is desirable to know and/or provide information about the thing to which the article is attached, or the article itself. For example, a clothing tag (or any other type of tag) may incorporate a GEI (such as GEI 310, 410, 510, 1010, etc.), an RFID tag, and/or one or more verification areas.

In another example, illustrated in FIG. 21, a security badge 4000 incorporates a GEI 4010, which may be substantially similar to GEI 310, 410, 510, 1010, et cetera. Accordingly, the GEI 4010 includes a static portion 4012 and an intrinsic portion 4014. The intrinsic portion 4014 may be configured to change state based on a trigger. In embodiments, the badge 4000 further includes an RFID tag 4025. The RIFD tag 4025 may be an active or a passive RFID tag, as is known in the art, and may be utilized as is known in the art, for example, to track the location of the badge 4000. As has been described herein, the GEI 4010 may be configured to change state based on a trigger. In this example, consider that the badge owner is a maintenance worker at ABC Corporation. The worker (John Smith) may not be authorized to enter all areas of ABC Corp. at all times. Rather, John may be permitted to enter only those areas that are in need of maintenance. One or more signal generators and/or GEI reading devices (which may be combined into a single device) may be located throughout ABC Corp. When it is determined that John is needed in a particular area, the signal generator may be sent to his badge 4000 (i.e., as identified by the RFID tag) to update the GEI intrinsic portion 4014 to allow entry into that particular area. When John approaches the area, a GEI reading device may see the GEI on John's badge 4000, ascertain that access has been granted, and open the door for John to enter the restricted area. After John has completed the job, the intrinsic portion 4014 may be "reset" to again prevent John from entering the restricted location. The reading devices throughout ABC Corp. may be configured to identify information on a GEI to allow or deny entry into various locations. Thus, access to various areas within a restricted zone can be easily and quickly granted and restricted based on the immediate needs of that area.

Unfortunately, occasionally badges 4000 will be lost or stolen and access to certain restricted areas could be unintentionally granted to the wrong person. Accordingly, in some embodiments, cameras within the organization may be configured to scan an area and provide facial mapping, spatial mapping, etc. to verify that the badge 4000 is associated with the correct person. As John moves throughout ABC Corp., the cameras placed thereabout may continuously map his location within the corporation, and through facial recognition, confirm that it is indeed John that is wearing the badge 4000. If at some point it becomes clear that the badge 4000 is being worn by someone other than John, entry into certain areas may be restricted, even though the GEI may still be configured to allow the wearer of the badge 4000 access to the restricted area. Thus, multiple forms of security may be easily and seamlessly employed to ensure the safety of personnel throughout an organization.

Of course, the security badge 4000 need not be a badge exclusive to a company. In embodiments, the badge 4000 may be a driver's license, passport, or any other identification card. Further, the security badge 4000 may be a user instrument (e.g., a card) comprising a GEI that may be updated to provide admission to a particular event, such as a concert, or game, or amusement park, or to provide access to services, such as a boarding pass for travel. Each time the card is scanned providing the user entry, the GEI may be automatically updated to prevent re-entry and/or reuse of the card without appropriate authorization.

Figure 9:
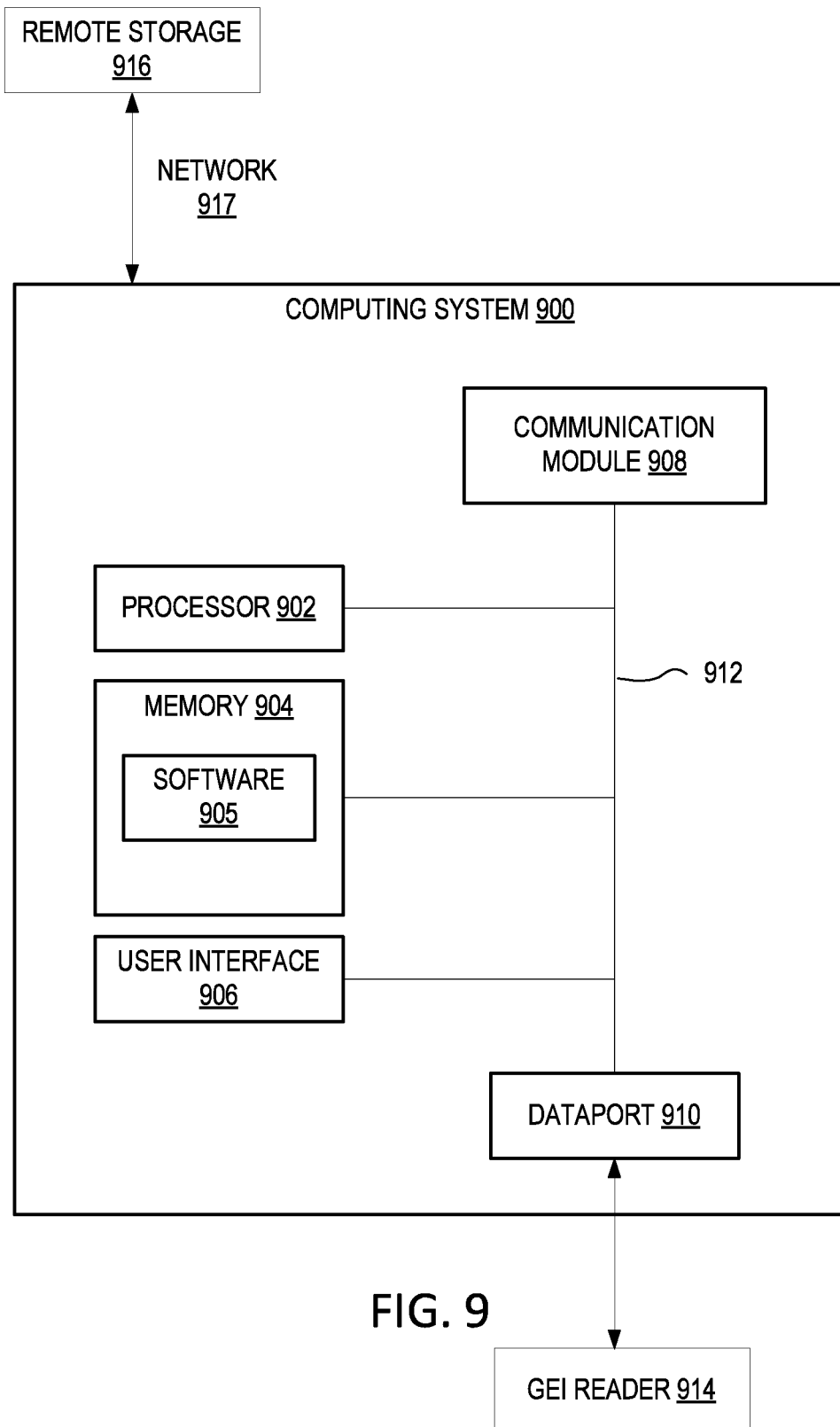
FIG. 9 shows a computing system for reading and processing the various graphically encoded icons disclosed herein.

Moving on, FIG. 9 is a functional block diagram of a computing system 900 which may be used to implement the various graphically encoded icon embodiments according to the different aspects of the disclosure. The computing system 900 may be, for example, a smartphone, a laptop computer, a desktop computer, a flexible circuit board, or other computing device whether now known or subsequently developed.

The computing system 900 includes a processor 902, a memory 904, a user interface 906, a communication module 908, and a dataport 910. These components are communicatively coupled together by an interconnect bus 912. The processor 902 may include any processor used in smartphones and/or other computing devices, including an analog processor (e.g., a Nano carbon-based processor, magnetic, photonic, pneumatic, hydraulic, thermal, convection, biochemical, gravimetric, etc.). In certain embodiments, the processor 902 includes one or more other processors, such as one or more microprocessors, and/or one or more supplementary co-processors, such as math co-processors.

The memory 904 may include both operating memory, such as random access memory (RAM), as well as data storage, such as read-only memory (ROM), hard drives, optical, flash memory, or any other suitable memory/storage element. The memory 904 may include removable memory elements, such as a CompactFlash card, a MultiMediaCard (MMC), and/or a Secure Digital (SD) card. In certain embodiments, the memory 904 includes a combination of magnetic, optical, and/or semiconductor memory, and may include, for example, RAM, ROM, flash drive, and/or a hard disk or drive. In embodiments incorporating SPEC particles, memory may include the visual aspects of the color change itself (e.g., the particles remain in a colored-1 or colored-2 state until stimulated into another state). The processor 902 and the memory 904 each may be located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 902 may be connected to the memory 904 via the dataport 910.

The user interface 906 may include any user interface or presentation elements suitable for a smartphone and/or other computing device, such as a keypad, a display screen, a touchscreen, a microphone, and a speaker. The communication module 908 is configured to handle communication links between the computing system 900 and other, external devices or receivers, and to route incoming/outgoing data appropriately. For example, inbound data from the dataport 910 may be routed through the communication module 908 before being directed to the processor 902, and outbound data from the processor 902 may be routed through the communication module 908 before being directed to the dataport 910. The communication module 908 may include one or more transceiver modules configured for transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, BLE, 5G-IoT, or any other protocol and/or technology.

The dataport 910 may be any type of connector used for physically interfacing with a smartphone, GEI (graphically encoded icon) reader 914, and/or other device, such as a mini-USB port or an IPHONE®/IPOD® 30-pin connector or LIGHTNING® connector. In other embodiments, the dataport 910 may include multiple communication channels for simultaneous communication with, for example, other processors, servers, and/or client terminals.

The GEI reader 914 may be in data communication with the computing system 900. The GEI reader 914 may be a scanner, such as one-dimensional barcode scanner, an imager, or other reader that allows for the various graphically encoded icons discussed herein to be read by the computing system 900 for decoding. In embodiments, the reader 914 is merely a camera capable of picking up and analyzing the information from the graphically encoded icon and transmitting that information to the system 900. As discussed herein, in further embodiments, the GEI reader may include a RFID reader, or an RFID reader may be additionally incorporated into the system in conjunction with a GEI reader. The RFID reader may be capable of receiving RFID signals from an RFID tag, and may additionally be configured to read and transmit data from a graphically encoded icon that incorporates an RFID tag or RFID technology, as described above.

The memory 904 may store instructions for communicating with other systems, such as a computer. The memory 904 may store, for example, a program (e.g., computer program code) adapted to direct the processor 902 in accordance with the present embodiments. The instructions also may include program elements, such as an operating system. While execution of sequences of instructions in the program causes the processor 902 to perform the process steps described herein, hard-wired circuitry may be used in place of, or in combination with, software/firmware instructions for implementation of the processes of the present embodiments. Thus, unless expressly noted, the present embodiments are not limited to any specific combination of hardware and software.

In embodiments, the memory 904 may include software 905. The software 905 may contain machine readable instructions configured to be executed by the processor 902. The software 905 may, e.g., process data obtained from the GEI reader 914. In embodiments, the software 905 may cause the computing system 900 to dynamically respond to a reading obtained by the GEI reader 914. For example, the software 905 may order an item based on a reading obtained by the GEI reader 914. Alternately or in addition, the software 905 may round up, round down, integrate, stabilize, average, and/or otherwise mathematically manipulate the outputs of the various fuzzy fields. The software 905, e.g., one or more modules thereof, may also be used for error correction.

The computing system 900 may be in data communication with a remote storage 916 over a network 917. The network 917 may be a wired network, a wireless network, or comprise elements of both. The remote storage 916 may be, e.g., the "cloud" or other remote storage in communication with other computing systems. In embodiments, data (e.g., readings obtained by the GEI reader 914 and the dynamic responses of the computing system 900 thereto) may be stored in the remote storage 916 for analytics.

While graphically encoded icons are described above as a separate physical embodiment such as a label, coating, paint, etc., it shall be understood that a graphically encoded icon is more broadly a collection of visually identifiable matter (or energy fields) that can be used to observe meaningful information about an object, an assembly of objects, etc. Graphically encoded icons may therefore also be naturally occurring (e.g., patterns that occur naturally on/in an object, waveform patterns, anomalous biological cells, traffic patterns, antenna arrays, thermal scans, etc.) and may occur in clusters that are identifiable at a smaller scale but provide information about a larger scale assembly of objects.

Accordingly, graphically encoded icons may be incorporated into a broader scanning and surveillance system that gathers information directly from an object itself acting as the graphically encoded icon, or from the object in conjunction with a physically separate graphically encoded icon, such as the labels described herein. The graphically encoded icons may be recognizable and readable via video surveillance systems. Video surveillance systems are known in the art. Over time, video surveillance has evolved from the use of low-resolution, fixed focus, fixed focal-length cameras to fully adaptive intelligent pan-tilt-zoom 360-degree domes. The flexibility of multidimensional scanning systems (e.g. advanced surveilling equipment) can be utilized to perform visual identification of people, animals, vehicles, inanimate fixed position objects, and complex moving objects that are moving in unpredictable manners.

Combining surveillance and scanning technologies may provide a universal scanning system that can operate in multiple dimensions and identify subjects including individuals (and attributes of the individual), animals, and objects in a location (e.g., building materials in a particular location). Scanning of uniquely identifiable shapes (e.g., GEIs) and movement trending data (e.g., movement of individuals and/or animals) can yield a complete spectrum of indicators the can be used to identify the presence, location, and meaning of all subjects being scanned. In some embodiments, as described herein, one or more cameras may be utilized to develop and/or recognize three-dimensional images of persons or spaces (e.g., facial mapping and/or spatial mapping) to verify a person's identity and/or the precise location of a particular person or graphically encoded icon. Together with the graphically encoded icon (e.g., graphically encoded icon 310, 410, 510, 600, 1010, etc.), the mapping may allow for an automatic two-step authentication of a user. In scanning for information, varying abilities to focus, zoom, and planar alignment can yield unreliable and unpredictable image information on a single scan which can be improved by providing clearly identifiable graphical indicators of a coarse nature as well as redundant repetitive image icons that occur at varying scale-levels. For example, the repeating pattern of a specific shape within other smaller scale shapes (e.g., fractal geometry) can be a trigger for recognizing a pattern that is out of frame from the observer's view to provide particular (e.g., redundant, preemphasis, forward error correction, cyclical error detection, encrypted, cross-media data striping, etc.) information about a subject. These techniques, as well as mathematical predictive techniques, can be used to provide rapid and reliable recognition of image intelligence. The net result of stacked and scaled patterns can yield localized quantified results that contain the same statistical character as the whole graphically encoded icon at varying zoom levels as well as partial field view graphically encoded icon observation. For example, when observing a full-frame image of the whole graphically encoded icon, the observer may identify a pattern of apparent black and white dots. However, if the observer where to zoom-in (or angularly align) on a particular dot pattern within the graphically encoded icon, it may become clear that there is finer granularity (e.g., resolution) imagery contained within the dot itself. Furthermore, it is possible that the dot image may contain a micro-scaled (or macro-scaled, subset, superset) version of the entire content imagery of the graphically encoded icon itself. These scaled and optionally redundant patterns may repeat in scale to many levels that grow into macro, micro, and nano-scale. These techniques of encoding may be utilized to provide ease of identification, authentication, security validation, encryption, and minimized re-scanning of the graphically encoded icon. It is important to note that strategic encoding techniques within a dot pattern (e.g., internal content(s) within a graphically encoded icon image or dot) can be utilized to encode intentional averaging of gray-scale, color, or thermal imagery as an integrated view by a coarse wide-angle (e.g., low resolution) observation. This means that the dots or apparent image attributes may appear as simple resolvable dots but may contain multiple layers (e.g. multiple dimensioned arrays) of complex composite information within each apparent dot.

By utilizing and exploiting natural and unnatural patterns in a recursive pattern of shapes the encoded information can be packed in such a way as to provide scalable decoding at various zoom levels, angular planar views, and focus levels. Information encoded in geometric patterns that are fractal encoded (or other recursive patterns) can exploit shapes that either are naturally occurring in nature or are not naturally occurring in nature to encode and modulate recognizable patterns related to the intelligence of information encoded within the composite shapes (e.g. GEIs). Shapes and geometric patterns may be enhanced or accentuated utilizing reinforcing waveform and media types such as varying colors, wavelengths of transmissive and/or reflective materials, magnetic, radioactive, thermal, electrical, and physically oscillating materials (e.g. quartz crystals), fluorescing materials (biological films, bacteria, etc.), position changing actuators, magnetic tape, laser reflection (CD-ROM/DVD like surfaces), etc. Geometric shaped encoding methods may be used to allow a GEI to become mathematically resolvable in order to correct for non-ideal focal lengths, planar alignment, and non-ideal image framing.

In embodiments, the full implementation of a scanning system could thus provide the ability to provide scanning, surveilling, dissecting, categorizing, decoding, and resolving of all subjects (or selected category of subjects) within an observer's (or scanning device's) field of view in the system. Optionally, the observed subjects can be superimposed with unique identifying markers known as 3D spatial markers. The marking content can be graphical in the form of iconic encoded information that is identifiable by scanning algorithm methods.

Thus, as has been described, the graphically encoded icons disclosed herein may represent a significant advance over the traditional machine readable indicia embedded in one dimensional, two dimensional, multi-dimensional and other such barcodes. Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. Not all steps listed in the various figures need be carried out in the specific order described.

The invention claimed is:

1. A user instrument for engaging in a transaction, comprising:
 a graphically encoded icon, comprising:
  a static portion;
  an intrinsic portion comprising an area of stimuli-responsive material defining a first machine-readable indicia;
 wherein:
  at least a portion of the stimuli-responsive material transforms from a first state to a second state in response to a trigger;
  the transformation from the first state to the second state of the portion of the stimuli-response material results in a second machine-readable indicia; and
  the second machine-readable indicia comprises information to permit or deny the user to engage in a transaction via the user instrument.

2. The user instrument of claim 1, wherein:
the user instrument is a credit card;
the trigger is a transaction using the credit card; and
the second machine-readable indicia comprises information relating to the transaction using the credit card.

3. The user instrument of claim 1, wherein:
the user instrument is a security badge;
the trigger is a signal operable to transform the stimuli-responsive material from the first state to the second state; and
the second machine-readable indicia comprises information that allows or denies the user entry into a restricted location.

4. The user instrument of claim 1, wherein the user instrument is a label.

5. The user instrument of claim 1, further comprising a second area of stimuli-responsive material configured to transform in response to a trigger, wherein the transformation of the stimuli-responsive material of the second area results in human readable indicia.

6. The user instrument of claim 5, wherein the second area of stimuli-responsive material forms a part of the graphically encoded icon.

7. The user instrument of claim 1, wherein the machine-readable indicia is non-human readable.

8. A graphically encoded icon, comprising:
a label attached to an object, the label comprising a static portion and an intrinsic portion;
wherein:
the static portion comprises machine-readable indicia;
the intrinsic portion comprises an area of stimuli-responsive material;
the stimuli-responsive material is configured to change from a first state to a second state in response to a trigger, the change in state being based on an attribute about the object; and
the transformation of the stimuli-responsive material is a change in the transparency of the stimuli-responsive material.

9. The graphically encoded icon of claim 8, wherein the change in state of the stimuli-responsive material results in machine-readable indicia.

10. The graphically encoded icon of claim 9, wherein the machine-readable indicia of the stimuli-responsive material is non-human readable.

11. The graphically encoded icon of claim 10, wherein the machine-readable indicia of the static portion is non-human readable.

12. The graphically encoded icon of claim 8, wherein the trigger is a change in temperature, and wherein the trigger occurs when the change in temperature is above or below a predetermined threshold.

13. The graphically encoded icon of claim 8, wherein the trigger occurs automatically based on a predetermined condition about the attribute of the object.

14. A graphically encoded icon, comprising:
a label attached to an object, the label comprising a static portion and an intrinsic portion;
wherein:
the static portion comprises machine-readable indicia;
the intrinsic portion comprises an area of stimuli-responsive material;
the stimuli-responsive material is configured to change from a first state to a second state in response to a trigger, the change in state being based on an attribute about the object; and
the transformation of the stimuli-responsive material is a change in the reflection of the stimuli-responsive material.

15. The graphically encoded icon of claim 14, wherein the trigger occurs automatically based on a predetermined condition about the attribute of the object.

16. An article, comprising:
a user instrument associated with a user, the user instrument comprising a graphically encoded icon, the graphically-encoded icon comprising an area of stimuli-responsive material defining a machine-readable indicia;
wherein:
the stimuli-responsive material is configured to change from a first state to a second state in response to a trigger; and
after the change of the stimuli-responsive material from the first state to the second state, the machine-readable indicia comprises information to permit or deny a user to engage in a transaction using the user instrument.

17. The article of claim 16, wherein the user instrument is selected from the list consisting of: a label, a credit card, and a badge.

18. The article of claim 16, wherein the machine-readable indicia is non-human readable.

19. The article of claim 16, wherein the trigger occurs automatically based upon a predetermined condition.

20. The article of claim 16, wherein the graphically encoded icon is configured as a QR code.

* * * * *

(12) INTER PARTES REVIEW CERTIFICATE (4097th)

United States Patent
Staton et al.

(10) Number: US 11,392,818 K1
(45) Certificate Issued: Aug. 8, 2025

(54) GRAPHICALLY ENCODED ICONS HAVING INTRINSIC ATTRIBUTES EMBEDDED THEREIN AND SYSTEMS AND METHODS FOR USING SAME

(71) Applicants: Fielding B. Staton; David Strumpf

(72) Inventors: Fielding B. Staton; David Strumpf

(73) Assignee: NEWTONOID TECHNOLOGIES, L.L.C.

Trial Number:

IPR2024-00932 filed May 22, 2024

Inter Partes Review Certificate for:

Patent No.: 11,392,818
Issued: Jul. 19, 2022
Appl. No.: 17/216,096
Filed: Mar. 29, 2021

The results of IPR2024-00932 are reflected in this inter partes review certificate under 35 U.S.C. 318(b).

INTER PARTES REVIEW CERTIFICATE
U.S. Patent 11,392,818 K1
Trial No. IPR2024-00932
Certificate Issued Aug. 8, 2025

AS A RESULT OF THE INTER PARTES REVIEW PROCEEDING, IT HAS BEEN DETERMINED THAT:

Claims 1 and 4-20 are cancelled.

\* \* \* \* \*